United States Patent
Niemela et al.

(10) Patent No.: US 12,539,816 B2
(45) Date of Patent: Feb. 3, 2026

(54) VEHICLE MOUNTED ACCESSORY

(71) Applicant: NB4 Brand L.L.C., Chassell, MI (US)

(72) Inventors: Marcus Niemela, Houghton, MI (US); Michael R. Jackson, Hancock, MI (US)

(73) Assignee: The Kingstar Company, Chassell, MI (US)

( * ) Notice: Subject to any disclaimer, the term of this patent is extended or adjusted under 35 U.S.C. 154(b) by 0 days.

(21) Appl. No.: 19/012,363

(22) Filed: Jan. 7, 2025

(65) Prior Publication Data
US 2025/0145087 A1      May 8, 2025

Related U.S. Application Data

(63) Continuation of application No. 18/050,208, filed on Oct. 27, 2022, now Pat. No. 12,187,235.

(60) Provisional application No. 63/272,875, filed on Oct. 28, 2021.

(51) Int. Cl.
*B60R 9/06*      (2006.01)

(52) U.S. Cl.
CPC ....................................... *B60R 9/06* (2013.01)

(58) Field of Classification Search
CPC ................ B60R 9/06; B60R 9/08; B60R 3/02
See application file for complete search history.

(56) References Cited

U.S. PATENT DOCUMENTS

| | | |
|---|---|---|
| 2,642,217 A | 6/1953 | Jennings |
| 3,913,811 A | 10/1975 | Spencer |
| 4,139,078 A | 2/1979 | Keller |
| 4,204,701 A | 5/1980 | Oltrogge |
| 4,347,638 A | 9/1982 | Weaver |
| 5,228,707 A | 7/1993 | Yoder |
| 5,280,934 A | 1/1994 | Monte |
| 5,312,150 A | 5/1994 | Quam |
| 5,516,179 A * | 5/1996 | Tidwell ............. B62D 33/0612 296/64 |
| 5,518,156 A | 5/1996 | Lehman |
| 5,626,440 A | 5/1997 | Greene, Jr. et al. |
| 5,653,459 A | 8/1997 | Murphy |
| 6,425,457 B1 | 7/2002 | Lundry |
| 7,516,997 B2 | 4/2009 | Kuznarik et al. |

(Continued)

FOREIGN PATENT DOCUMENTS

DE    102015207667    10/2016

*Primary Examiner* — James A English
(74) *Attorney, Agent, or Firm* — Gardner, Linn, Burkhart & Ondersma LLP

(57) ABSTRACT

An accessory support platform is provided for supporting a removable accessory, e.g. a stair system or cabinet, adjacent to a vehicle or portable living quarter, such as a truck-bed mounted camper. The accessory platform includes a support frame for coupling the platform to the truck camper. The support frame supports or suspends a support rail system from the rear portion of the truck camper. The rail system includes an upper support rail and a lower support rail that is suspended below and apart from the upper rail. The removable accessory may be coupled at one of or between both of the upper and lower support rails. The removable accessory is preferably readily repositionable relative to the upper and lower support rails. A coupling bracket and/or hanger secures the removable accessory to the rail system.

18 Claims, 36 Drawing Sheets

(56) References Cited

U.S. PATENT DOCUMENTS

| | | | |
|---|---|---|---|
| 7,806,308 B2 * | 10/2010 | Gunn | B60R 9/06 |
| | | | 248/222.51 |
| 9,527,448 B1 | 12/2016 | Kay et al. | |
| 9,771,025 B1 | 9/2017 | Nebel et al. | |
| 9,994,141 B1 | 6/2018 | Hanser et al. | |
| 10,098,314 B2 | 10/2018 | Murray | |
| 10,104,864 B2 | 10/2018 | Murray | |
| 10,518,708 B1 | 12/2019 | Honer et al. | |
| 10,829,165 B1 * | 11/2020 | Poole | B60R 9/06 |
| D937,730 S | 12/2021 | Hamilton et al. | |
| 11,400,850 B1 | 8/2022 | Curtis, III | |
| 11,840,197 B2 | 12/2023 | Niemela et al. | |
| 12,187,235 B2 | 1/2025 | Niemela et al. | |
| 2008/0067209 A1 | 3/2008 | Gunn | |
| 2011/0233954 A1 | 9/2011 | Micheli | |
| 2013/0341124 A1 | 12/2013 | Robinson et al. | |
| 2018/0228118 A1 | 8/2018 | Murray | |
| 2018/0228119 A1 | 8/2018 | Murray | |
| 2019/0037799 A1 | 2/2019 | Murray | |
| 2022/0009418 A1 | 1/2022 | Demonte | |
| 2022/0185189 A1 | 6/2022 | Houston | |
| 2022/0314890 A1 | 10/2022 | Sands | |
| 2022/0402738 A1 * | 12/2022 | Curtis, III | B66F 9/12 |
| 2023/0079766 A1 * | 3/2023 | Wallace | B60R 9/06 |
| | | | 224/519 |
| 2023/0100518 A1 | 3/2023 | Denz | |
| 2024/0109494 A1 * | 4/2024 | Niemela | B60R 3/02 |

* cited by examiner

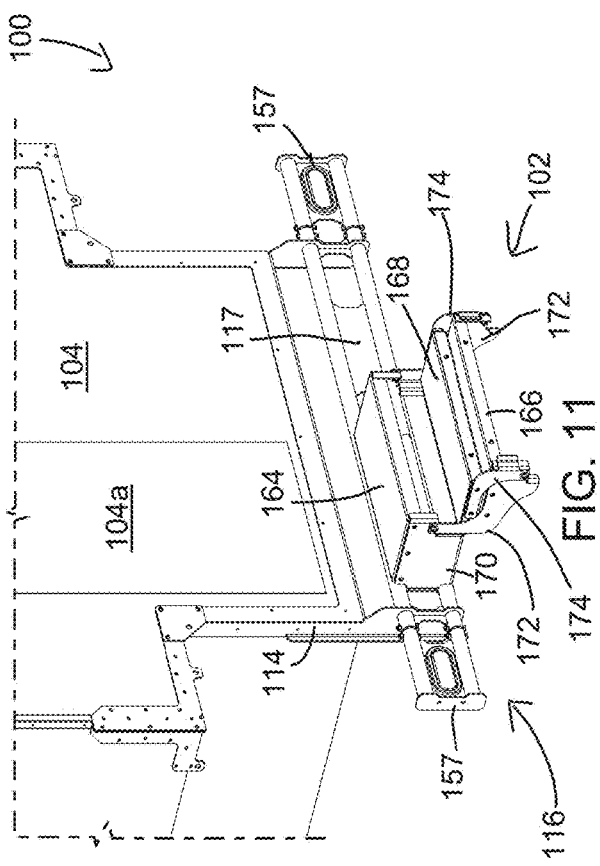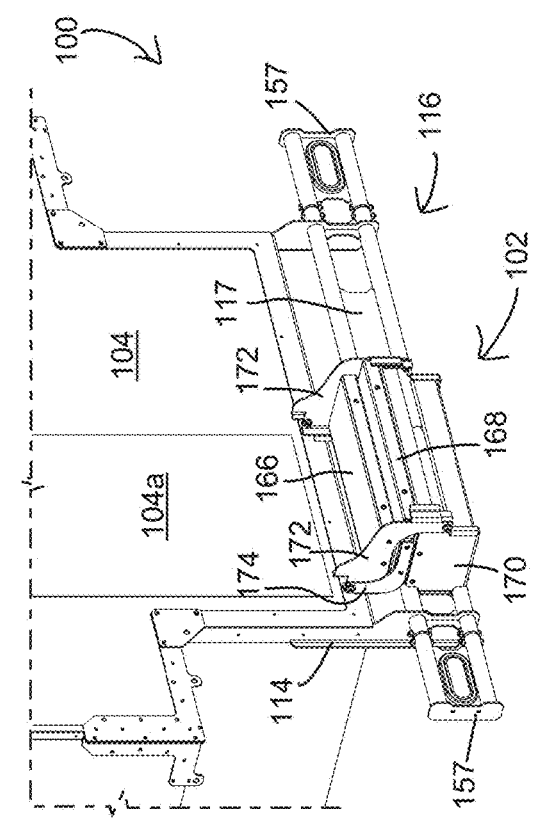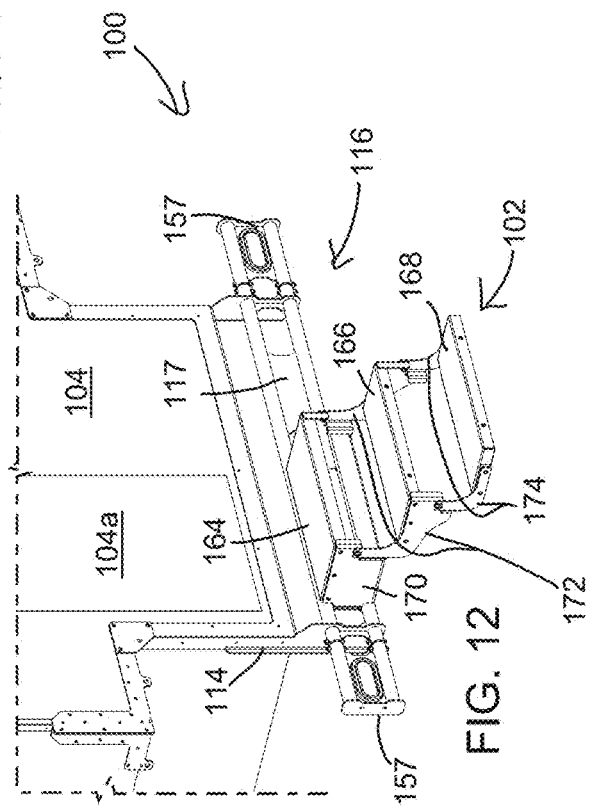

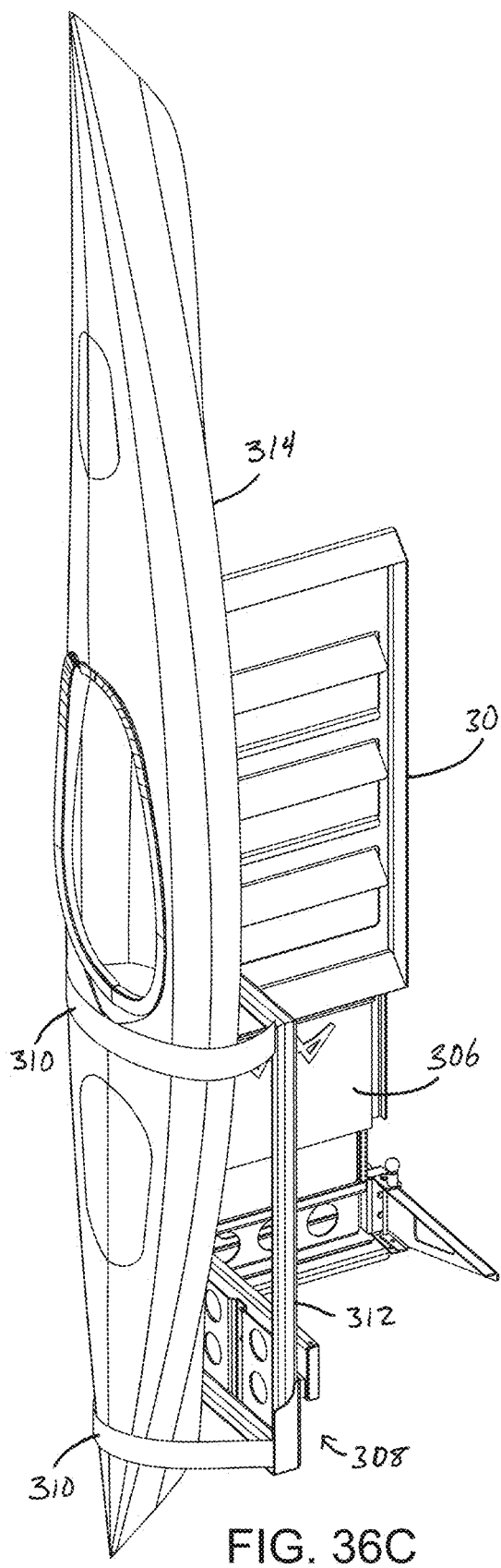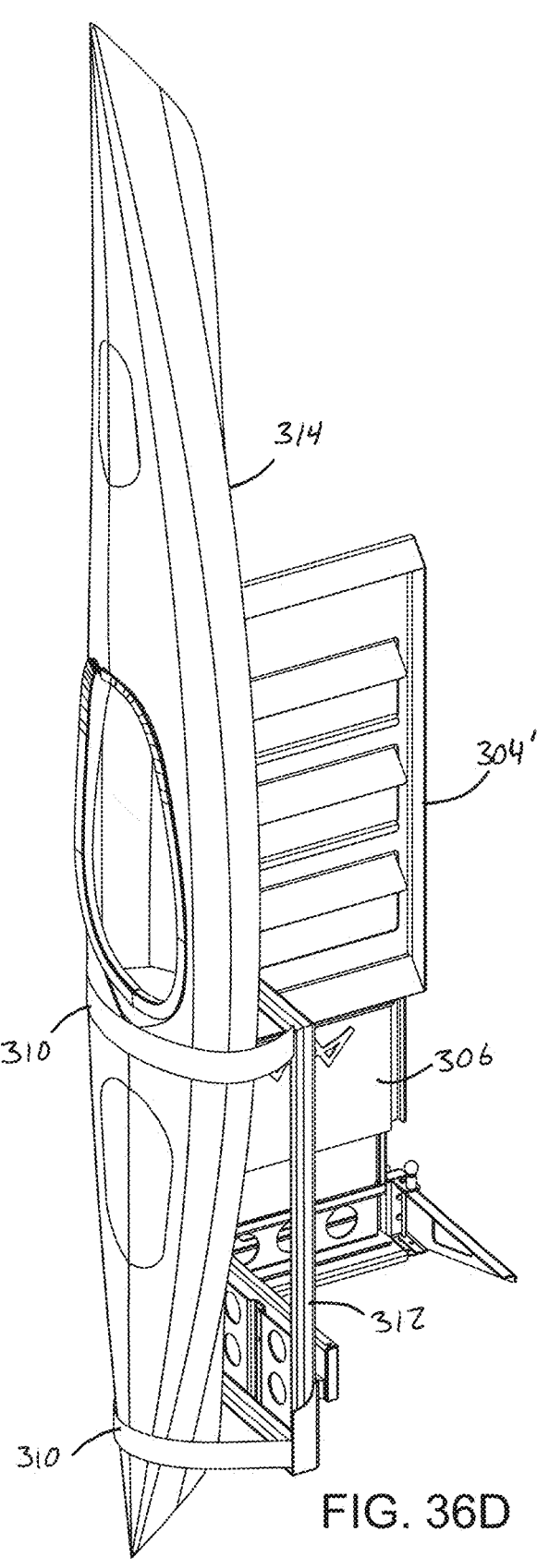
FIG. 36C
FIG. 36D

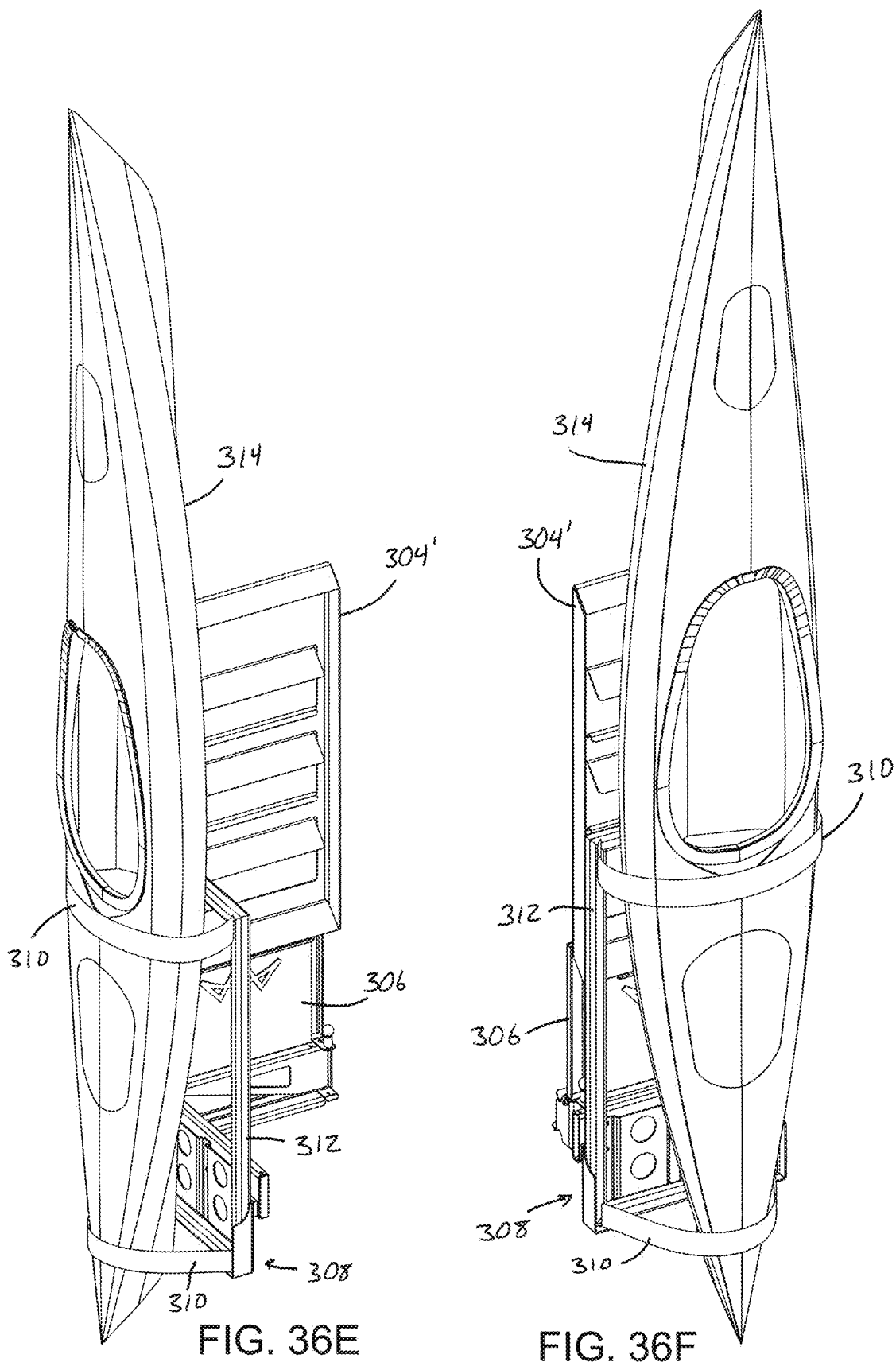

VEHICLE MOUNTED ACCESSORY

CROSS REFERENCE TO RELATED APPLICATIONS

The present application is a continuation of U.S. patent application Ser. No. 18/050,208, filed Oct. 27, 2022, now U.S. Pat. No. 12,187,235, which claims the benefit of U.S. provisional application Ser. No. 63/272,875, filed Oct. 28, 2021, which are both hereby incorporated herein by reference in their entireties.

FIELD OF THE INVENTION

The present invention relates to accessibility and storage features for vehicles, such as vehicle mounted campers.

BACKGROUND OF THE INVENTION

Truck beds of pickup trucks are difficult to access because of the height of the truck bed relative to the ground. Options for accessing a truck bed for those who are not able or do not want to lift themselves into the truck bed include the use of portable ramps, portable ladders, and backing the truck up to a ramp or elevated surface. Secure storage of equipment that is often used with trucks, campers, and trailers often requires the user of such equipment to unload the equipment from a secure interior portion of the vehicle, setup the equipment for use, and then reload the equipment into the vehicle after use to prevent theft or damage of the equipment.

SUMMARY OF THE INVENTION

The present invention provides, in its various forms, a vehicle-mountable accessory support platform for attachment or integration with a vehicle and provides a platform or interface for coupling various vehicle accessories adjacent the vehicle, such as deployable stair systems, access platforms, and storage units or compartments (e.g. closets, cabinets, slideable storage drawers, etc.) for storing various equipment. The accessory platform of the present invention may include structure and function identical or substantially similar to that of the vehicle mounted accessories, access platforms, and storage components disclosed in commonly owned and assigned U.S. patent application Ser. No. 17/100,004, filed Nov. 20, 2020 by NB4 Brand L.L.C., d/b/a/The Kingstar Company of Chassell, MI and entitled VEHICLE MOUNTED ACCESSORY, now U.S. Pat. No. 11,840,197, issued Dec. 12, 2023, the disclosure of which is hereby incorporated herein by reference in its entirety. The support platform may provide an access platform or "porch" providing a place for a user to stand proximate an exterior portion of a vehicle to allow the user to gain easier access to that portion of the vehicle. The supported accessory may include a deployable stairway to provide easier access to the vehicle. The supported accessory may be deployable so that it can be stowed for travel and deployed to provide vehicle access or storage access. Optional storage unit accessories provide secure storage for various equipment, tools, or accessories. The accessory platform is particularly well suited for use with truck-bed mounted camper units, however, it will be appreciated that the accessory platform may be coupled to any suitable vehicle, trailer, or portable living quarter. In embodiments in which the accessory platform is coupled to a truck-bed mounted camper unit, the accessory platform accompanies the truck camper and is removed from the vehicle when the truck camper is removed from the vehicle. It will be appreciated that the accessory platform may be separated or decoupled from the truck camper as well.

According to one form of the present invention, a vehicle mounted accessory support apparatus or platform is provided for supporting a removable accessory at or alongside a vehicle, such as a truck-bed mounted camper. The platform includes a support frame for coupling the platform to the camper, as well as a support rail system or assembly having an upper support rail and a lower support rail vertically spaced apart from one another. The support rails are supported at outboard ends of the support frame. The support frame includes a pair of outboard brackets for coupling to respective outboard, rear portions of the truck camper. The outboard brackets extend vertically below a rear portion of the truck camper. The outboard brackets are coupled to corresponding outboard end portions of the upper support rail and the lower support rail to suspend the support rails from the truck camper. The support frame may include a cross member coupled to a lower, rear portion of the truck camper and coupled between each of the outboard brackets. The removable accessory is preferably able to be repositioned laterally relative to the upper and lower support rails to permit various configurations and positions of the accessory relative to the rails and the vehicle. A universal accessory mounting device, in the form of a coupling bracket or plate, is coupled to the removable accessory to secure the accessory to the upper and lower support rails. The coupling bracket is fastened to a rear portion of the removable accessory with mechanical fasteners extending through a gap between the spaced apart upper and lower support rails. The coupling bracket and the removable accessory cooperate with one another to clamp onto support rail system.

In one aspect, the coupling bracket of the universal accessory mounting device includes a body defined by an elongate rectangular plate having a width of about the distance of the gap between the upper and lower support rail. An upper wing is coupled to an upper edge of the rectangular plate and the upper extends upward at an oblique angle from the rectangular plate. A lower wing is coupled to a lower edge of the rectangular plate and the lower wing extends downward at an oblique angle from the rectangular plate, from the same side of the plate as the upper wing. When the coupling bracket is fastened to the removable accessory, an upper or upward facing surface of the upper wing engages or presses against a lower portion of the upper support rail and a lower or downward facing surface of the lower wing engages or presses against an upper portion of the lower support rail. When the coupling bracket is tightened onto the removable accessory the coupling bracket is wedged between the upper and lower support rails and the coupling bracket and accessory cooperate to clamp onto the rail system. Optionally, a rear portion of the removable accessory extends between the upper and lower support rails to meet or join with the coupling bracket at a position between the support rails.

In another aspect, the universal accessory mounting device is provided in the form of a hanger is provided at each outboard end of the removable accessory to couple it to the accessory support platform. Each hanger is coupled to a rear portion of the removable accessory and each hanger includes at least one hook that, when coupled to the support rail system, extends over the top of and releasably engages either of the upper support rail and the lower support rail. Optionally, the hanger may include multiple hooks, including an upper hook that, when coupled to the support rail system, extends over the top of and releasably engages the upper support rail and a lower hook that, when coupled to the support rail system, extends over the top of and releasably engages the lower support rail. The hook or hooks of the hanger at least temporarily suspend the removable accessory from the support rail system. Optionally, a lock bracket couples with the hanger to engage a lower portion of either or the upper or lower support rail (opposing a hook of the hanger) to selectively lock the removable accessory onto the support rail system.

In yet another aspect, a stabilizer is coupled between a center portion of the removable accessory and one or both of the upper and lower support rails. The stabilizer includes a hook that, when coupled between the support rail system and removable accessory, extends over the top of and releasably engages either the upper or lower support rail. The stabilizer may include counter-balance support arm that abuts a rear portion of the support rail system to counteract rotation of the removable accessory relative to the support rail system.

In still another aspect, the accessory support platform includes a removable extension extending outboard from the upper and lower support rails with an upper extension rail coupled at an outboard end of the upper support rail and a lower extension rail coupled at an outboard end of the lower support rail. The removable extension extends outboard of the support frame and/or the vehicle and is provided to support a removable accessory at an outboard end of the support platform. The removable extension may be omitted, and the outboard ends of the support rail system may be configured to receive and support an auxiliary accessory outboard of the support frame. For example, a rail portion of a fence panel may be coupled to one or both of the upper and lower support rail to provide a corral or cage for a livestock animal.

In embodiments having a deployable stair system, the deployable stair may be similar or substantially identical in structure and function to the stair structures described in previously referenced U.S. patent application Ser. No. 17/100,004, now U.S. Pat. No. 11,840,197, issued Dec. 12, 2023. In one aspect, an exemplary deployable stair system includes a plurality of stair treads, with at least some of the treads being pivotably deployable or extendable between a deployed configuration and a stowed configuration. In the deployed configuration the stair system provides a plurality of stair steps permitting a user to access a portion of the vehicle (e.g.) such as the door of a truck-bed mounted camper. In the stowed configuration the stair treads are alongside one another, and in the deployed configuration the stair treads are spaced apart from one another. For example, the stair system may include a set of three stair treads with a second one of the stair treads having a second tread stringer frame with a first pivot arm pivotably coupled at its distal end with a lower portion of a first stringer frame that support the first stair tread in a fixed position. A third one of the stair treads includes a third tread stringer frame with a pivot arm pivotably coupled at its distal end with a distal portion of a second pivot arm of the second tread stringer frame. The second pivot arm of the second tread stringer frame is positioned at an opposite side of the second tread from the first pivot arm of the second frame. The second and third stair tread deploy by pivoting together away from the first stair tread and the third stair tread deploys further by pivoting away from the second stair tread. Optionally, a stop is coupled with the first pivot arm of the second tread stringer frame and is configured to abut a lower portion of the first tread stringer frame to support and retain the second stair tread in the deployed configuration. The third stair tread may also include a stop coupled with the pivot arm of the third tread stringer frame, which is configured to abut a distal portion of the second pivot arm of the second tread stringer frame to support and retain the third stair tread in the deployed configuration.

According to another form of the present invention, a pivotable staircase that is mountable to a vehicle or camper, and includes stowable stair-mount and platform support frames, a deployable set of stairs, and a deployable platform. The stair-mount frame and platform support frame are both pivotable about respective axes between extended and retracted positions, and are spaced apart from one another at least when extended. The platform is coupled between the stair-mount frame and the platform support frame, and is pivotable between an upright stowed position and a deployed position in which the platform rests on both the stair-mount frame and the platform support frame in their respective extended positions. When the platform support frame and stair-mount frame are in both retracted, the stair-mount frame is generally parallel to the platform support frame and retains the platform support frame in its retracted position.

Accordingly, the vehicle mounted accessory support platform of the present invention is coupled to a truck camper (or any suitable vehicle, trailer, or portable living quarter) and provides increased or easier access to an exterior portion of a truck-bed mounted camper door and/or storage compartments for equipment, tools, and accessories. The support platform includes a rail system and a universal accessory mounting device to secure one or more accessories to the rail system, such as an access platform, as stair system, a storage unit, etc., for example. The mounting device may include a backing plate and/or hangers that engage the rail system. The accessory may include a porch or standing platform to allow a user to stand proximate an exterior portion of truck camper that would otherwise be difficult to access. The accessory may be pivotably stowed for travel and storage and deployed to provide access to the accessory and/or vehicle. A storage bin accessory provides secure storage space for accessories and equipment such as tools and fuel tanks. The storage bin can also provide support for equipment, such as an electricity generator. The storage bin can be locked to secure equipment, including equipment supported on the storage bin. The support platform is fixed to the truck camper and is therefore removable from the vehicle when the truck camper is removed or decoupled from the vehicle.

These and other objects, advantages, purposes and features of this invention will become apparent upon review of the following specification in conjunction with the drawings.

BRIEF DESCRIPTION OF THE DRAWINGS

FIGS. 10-12 are left-rear perspective views of the support platform and truck camper of FIG. 1, depicted with the storage cabinet omitted and depicting sequential steps of deploying of the deployable stair system;

FIGS. 36A-36F are a series of left-rear perspective views of the pivotable staircase and sports equipment rack of FIG. 35, depicting sequential steps of converting from the deployed configuration to the stowed configuration.

DESCRIPTION OF THE PREFERRED EMBODIMENTS

Figure 1:
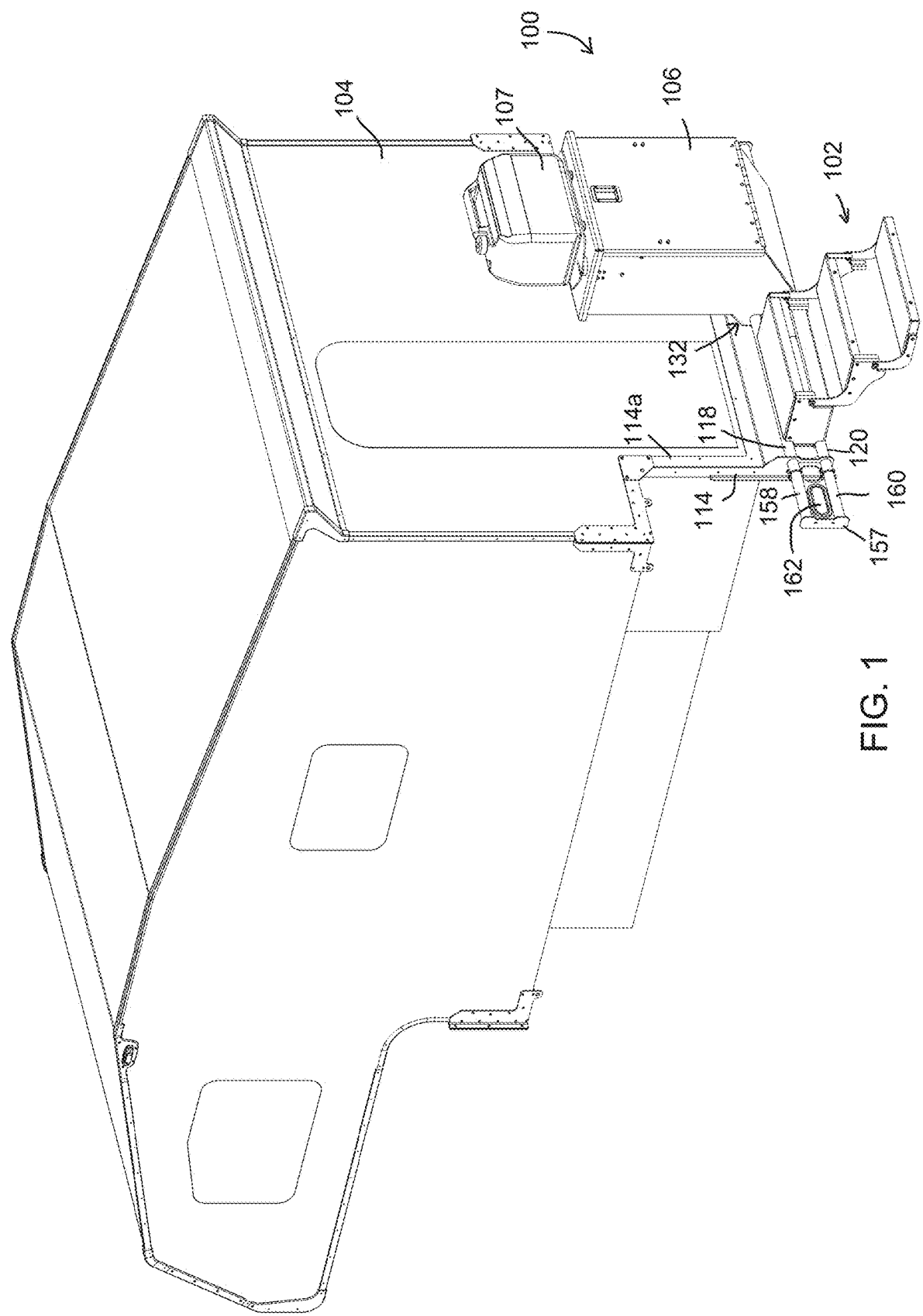
FIG. 1 is a left-rear perspective view of a vehicle mounted accessory support platform in accordance with an embodiment of the present invention, shown mounted to a rear of a truck-bed mounted camper unit and depicted with optional removable accessories, including a storage cabinet and a deployable stair system depicted in a deployed configuration.

Referring now to the drawings and the illustrative embodiments depicted therein, an accessory support apparatus or support platform 100 provides an interface for attaching various forms of accessories, such as a deployable stair system 102, to a vehicle, such as a truck-bed mounted camper 104. While the illustrated embodiments depict the platform 100 coupled to a truck camper 104, the platform 100 may be attached to or installed on other vehicles or vehicle transported accessories or living quarters, such as directly installed on a pickup truck or a trailer camper, for example. The support platform 100 is versatile and able to support various forms of accessories, such as the deployable stair system 102, storage compartments including cabinets 106, storage drawers 108, and clothing closets 110, and fixed (or deployable) access platforms 112. The cabinet 106 or other accessories may further support auxiliary accessories, such as an electricity generator 107, for example. The removable accessory, e.g. stair system 102, is preferably readily decoupled and repositioned relative to a portion of the platform 100 to permit various accessory positions and/or configurations, as desired by a user.

The accessory support platform 100 includes a support frame 114 for coupling the platform 100 to the camper 104, as well as a support rail assembly or system 116 having an upper support rail 118 and a lower support rail 120 vertically spaced apart from one another (FIGS. 1, 2, 4, 6-8, 10-14, and 16-22). As best shown in FIG. 3, the support frame 114 includes a pair of outboard mounting brackets 114a configured to couple to respective outboard, rear portions of the truck camper 104, such as with mechanical fasteners (e.g. screws or bolts). Each of the outboard brackets 114a extends vertically downward from the truck camper 104 below a rear portion of the truck camper 104. The outboard brackets 114a are coupled to corresponding outboard end portions of the upper support rail 118 and the lower support rail 120 to suspend the support rail system 116 from the truck camper 104. A cross member 114b is coupled between each of the outboard brackets 114a (FIG. 3). The cross member 114b may be coupled to a lower rear portion of the truck camper 104, such as with mechanical fasteners. The support frame 114 may be readily detachable or removable from the truck camper 104 in order to store the platform separate from the truck camper 104.

Figure 2:
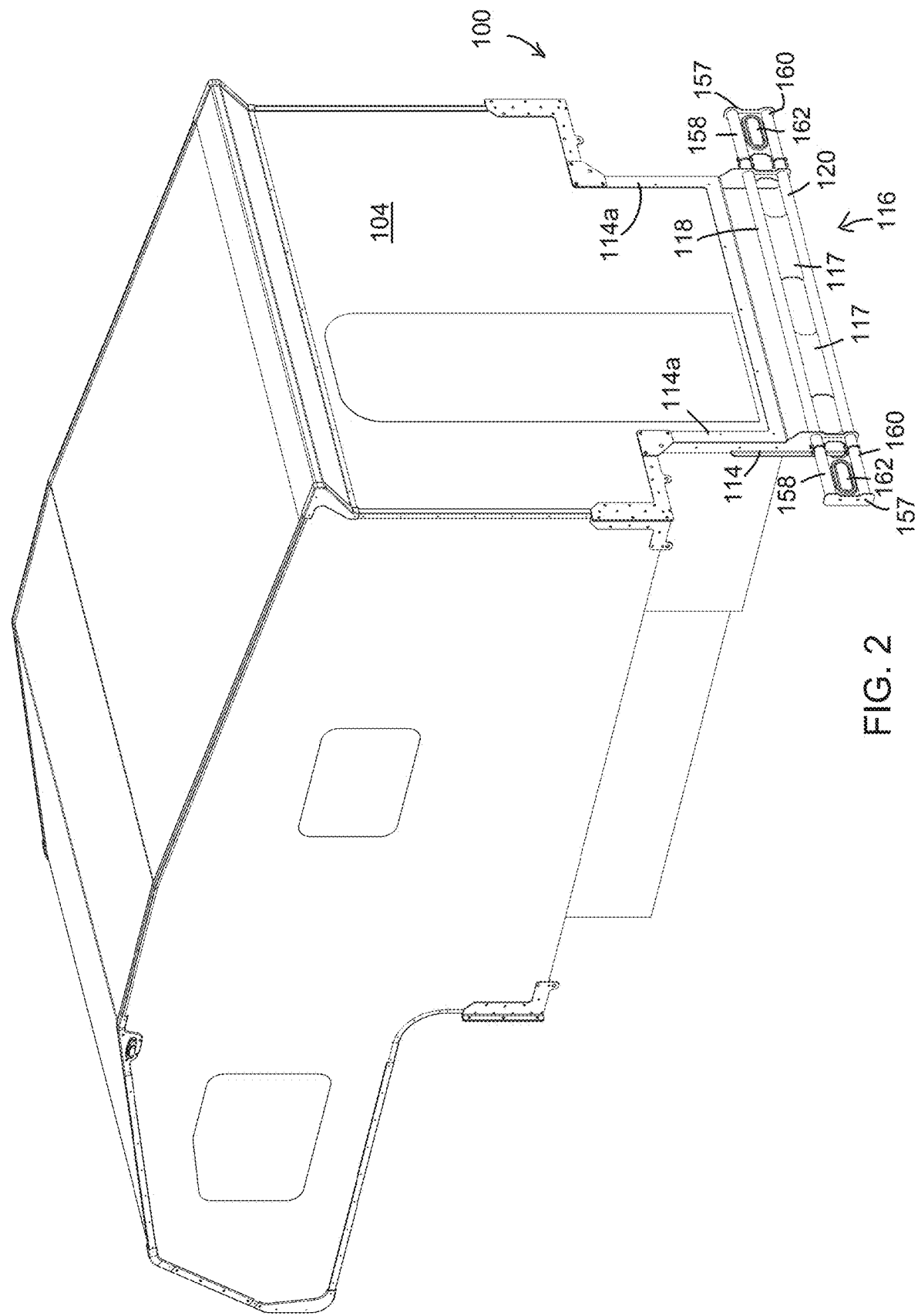
FIG. 2 is a left-rear perspective view of the support platform and truck camper of FIG. 1, depicted with the storage cabinet and deployable stair system omitted to illustrate structure of the support platform.
Figure 3:
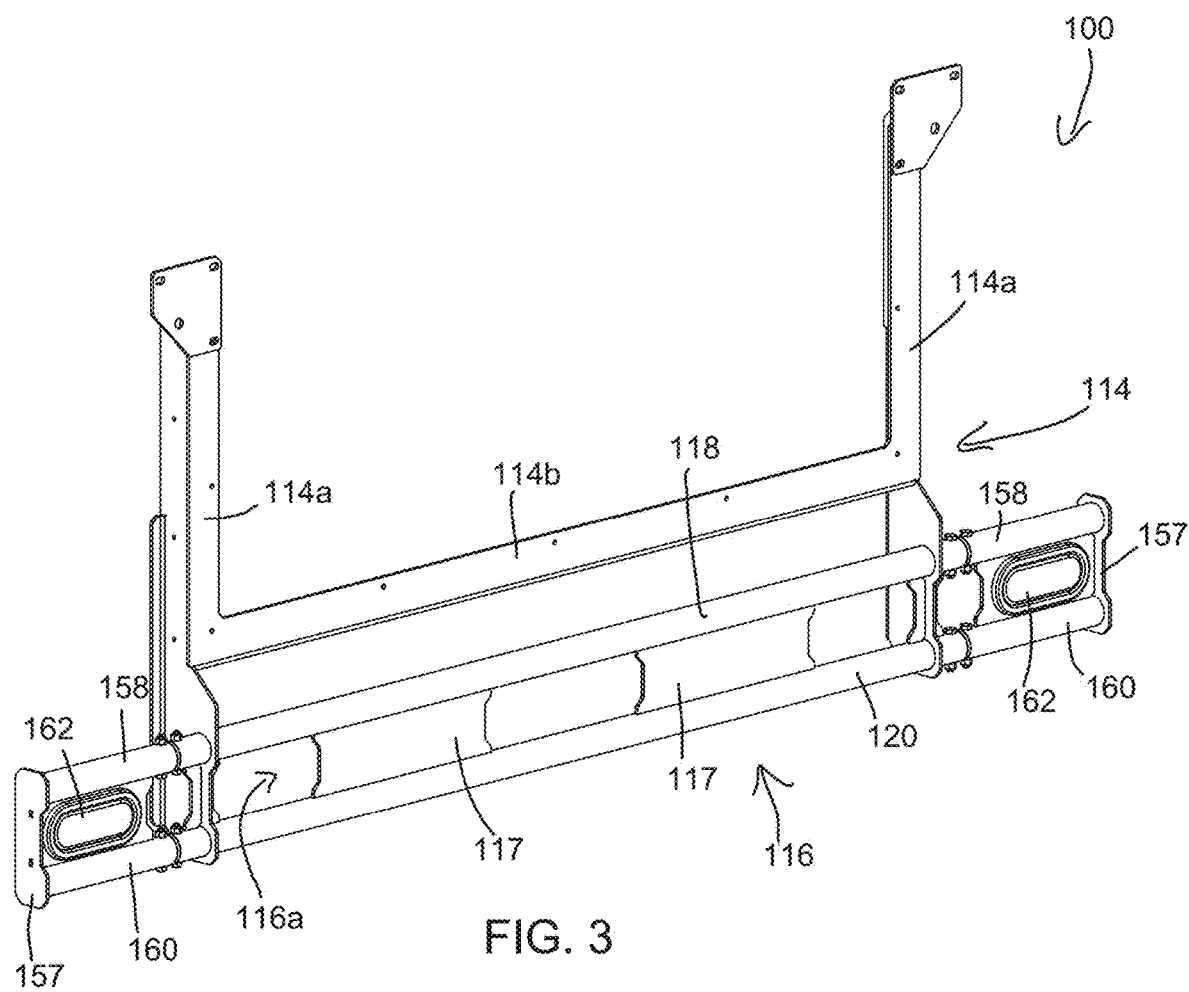
FIG. 3 is a left-rear perspective view of the support platform of FIG. 2.
Figure 4:
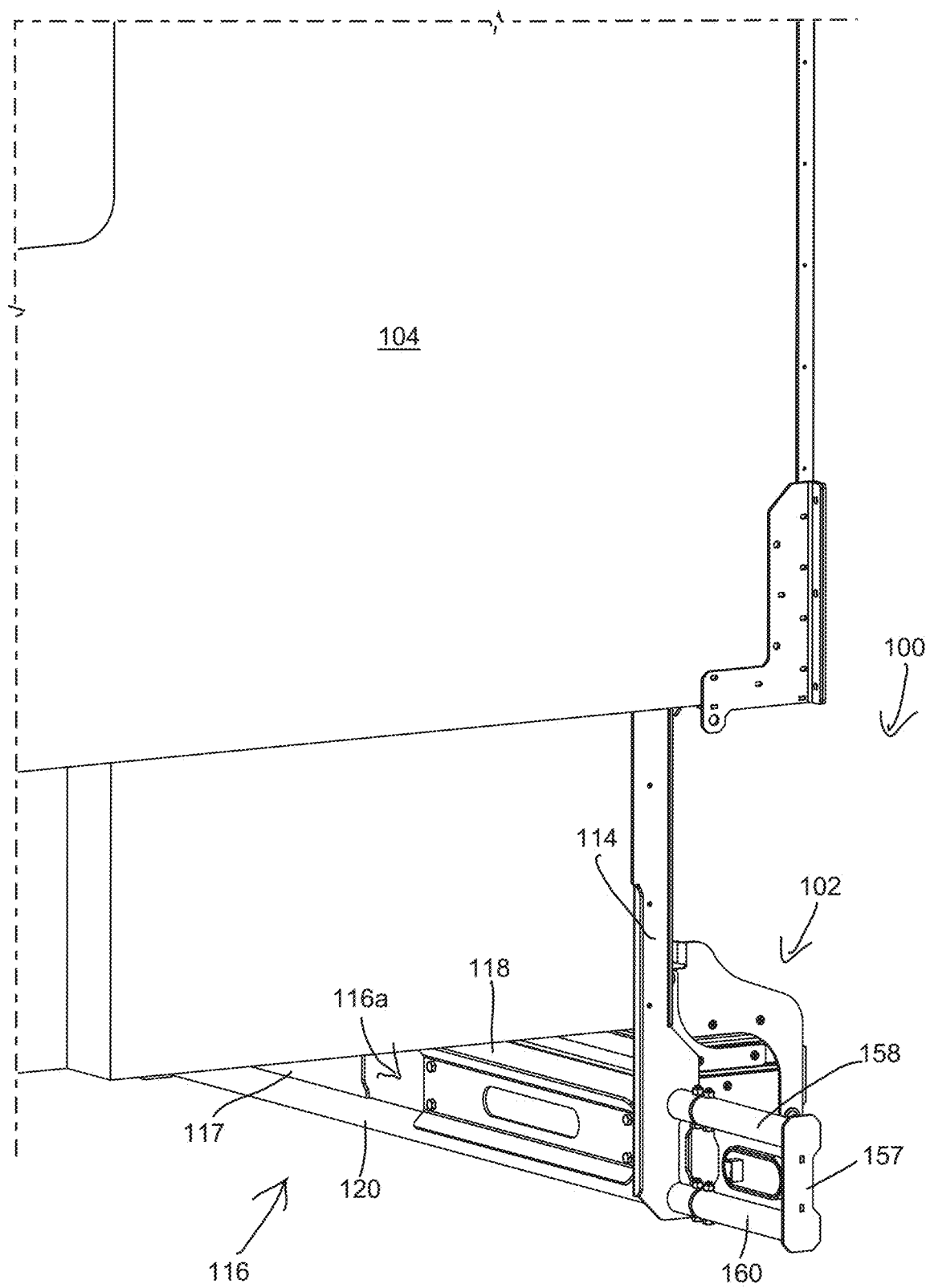
FIG. 4 is a left-front perspective view of the support platform and truck camper of FIG. 1.

The support rails 118 and 120 extend laterally perpendicular to the forward direction of travel of the truck camper 104 (as when transported by a truck) and the upper rail 118 is positioned above and spaced apart from the lower support rail 120, with a gap formed between the rails 118 and 120 (FIGS. 2 and 3). Gussets, stiffeners, or ribbing 117 are provided between the rails 118 and 120 to stiffen the rail system 116 to better support loads from removable accessories (FIGS. 2, 3 7, 10-12, 15, and 21). The use of relative terms such as front, forward, rear, rearward, left, right, lateral, longitudinal, vertical, and their facsimiles are used in relation to the normal forward travel direction of the vehicle (e.g. car, truck, van, recreational vehicle, camper, etc.) For simplicity of this disclosure, while various accessories may be coupled to one or both of the rails 118 and 120, (some of which are disclosed above and below), unless otherwise noted, the remainder of the discussion in regards to FIGS. 1-8 and 10-12 will refer to the removable accessory in terms of the deployable stairs 102 (FIG. 9 is focused toward the attachment of storage cabinet 106 of FIG. 1).

As shown in the illustrated embodiments of FIGS. 4-8, a universal accessory mounting device, in the form or a coupling bracket or backing plate 122, secures the deployable stair system 102 to the upper and lower support rails 118, 120. It will be appreciated that aside from the stair system 102, the coupling bracket 122 can be utilized to couple any suitable accessory to the rail system 116 (e.g. such as the storage cabinet 106 shown in FIGS. 1, 8, and 9). The coupling bracket 122 is fastened to a rear portion of the stair system 102 with mechanical fasteners 123 (such as bolts) extending through the gap 116a between the upper and lower support rails 118, 120. The coupling bracket 122 and the stair system 102 cooperate with one another to apply a clamping force to multiple sides of the support rails 118 and 120, and thereby clamp the stair system 102 onto the support rail system 116.

Figure 5:
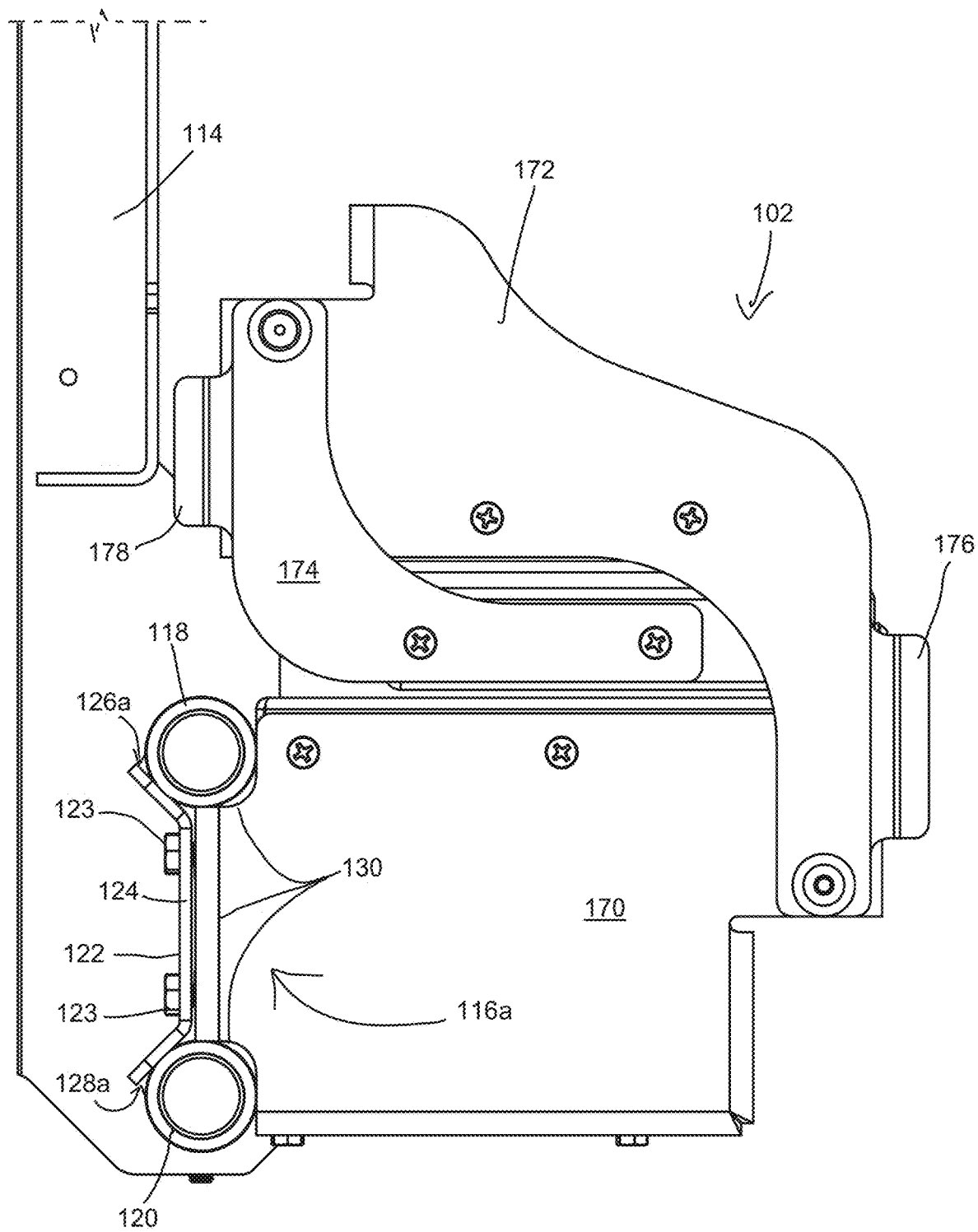
FIG. 5 is an enlarged left side sectional elevation view of a support rail system and deployable stair system of the support platform of FIG. 1, depicted with the stair system in a stowed configuration.
Figure 6:
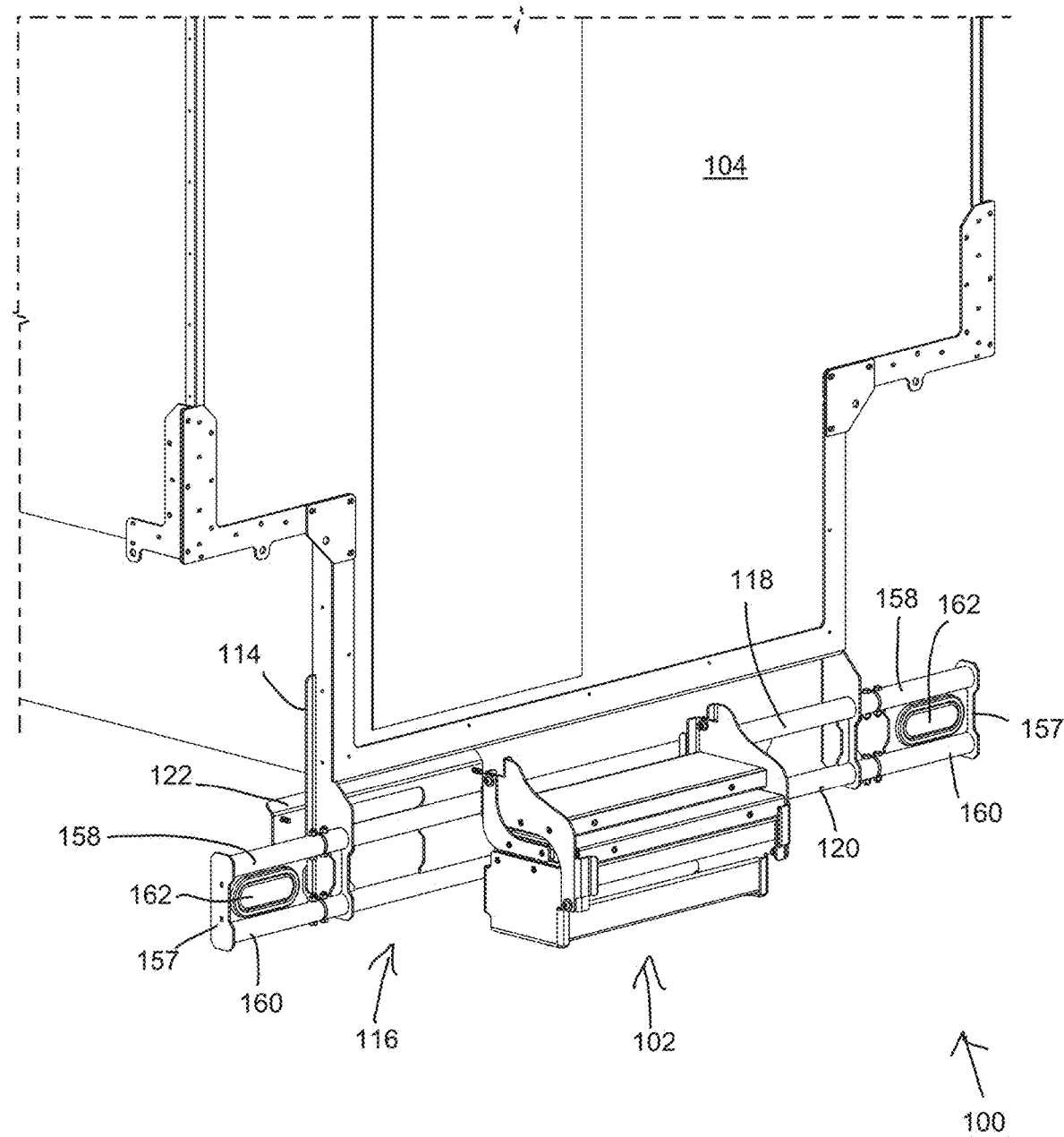
FIG. 6 is a partially exploded left-rear perspective view of the support platform and truck camper of FIG. 1, depicted with the storage cabinet omitted.
Figure 8:
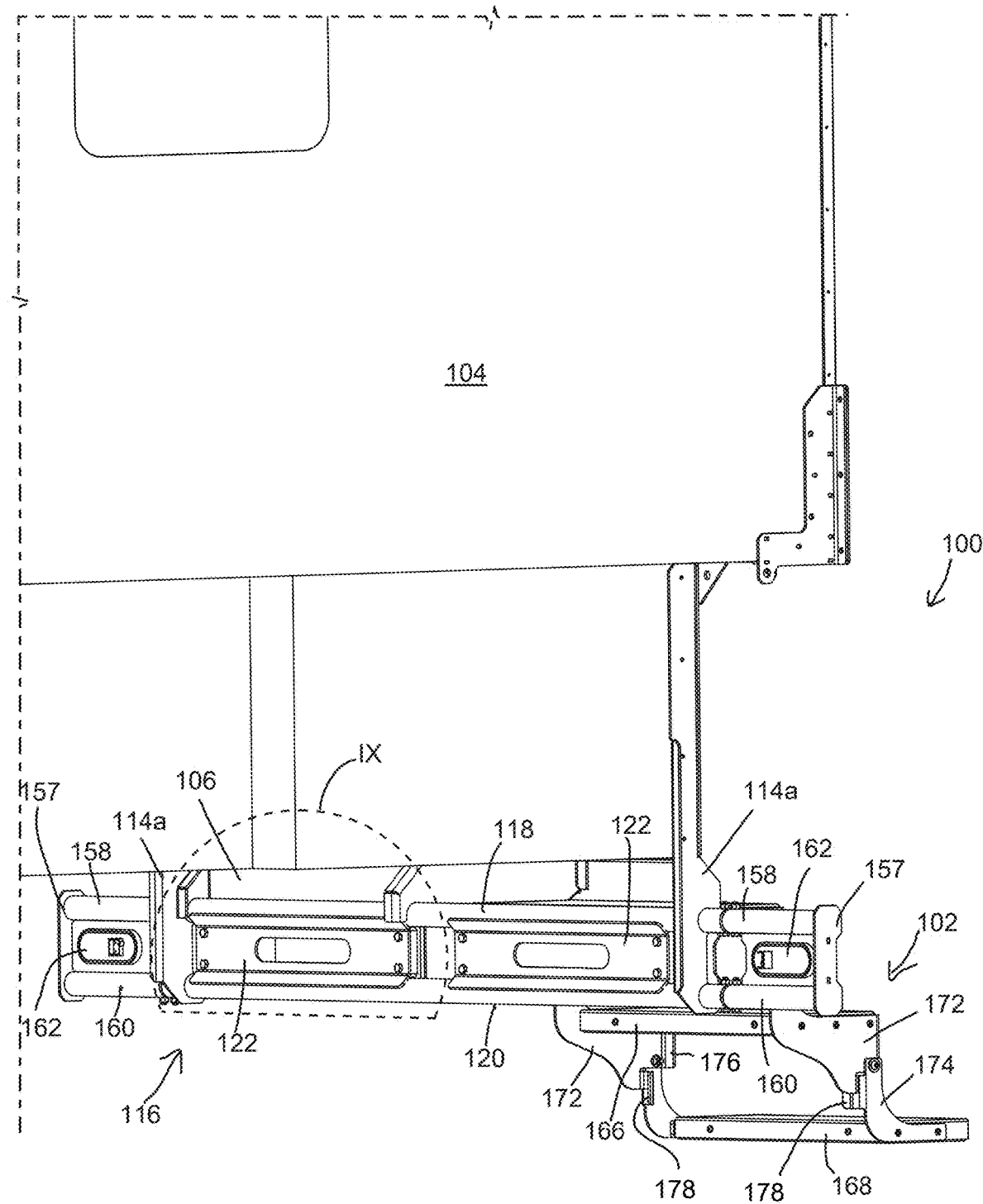
FIG. 8 is a left-front perspective view of the support platform and truck camper of FIG. 1.
Figure 9:
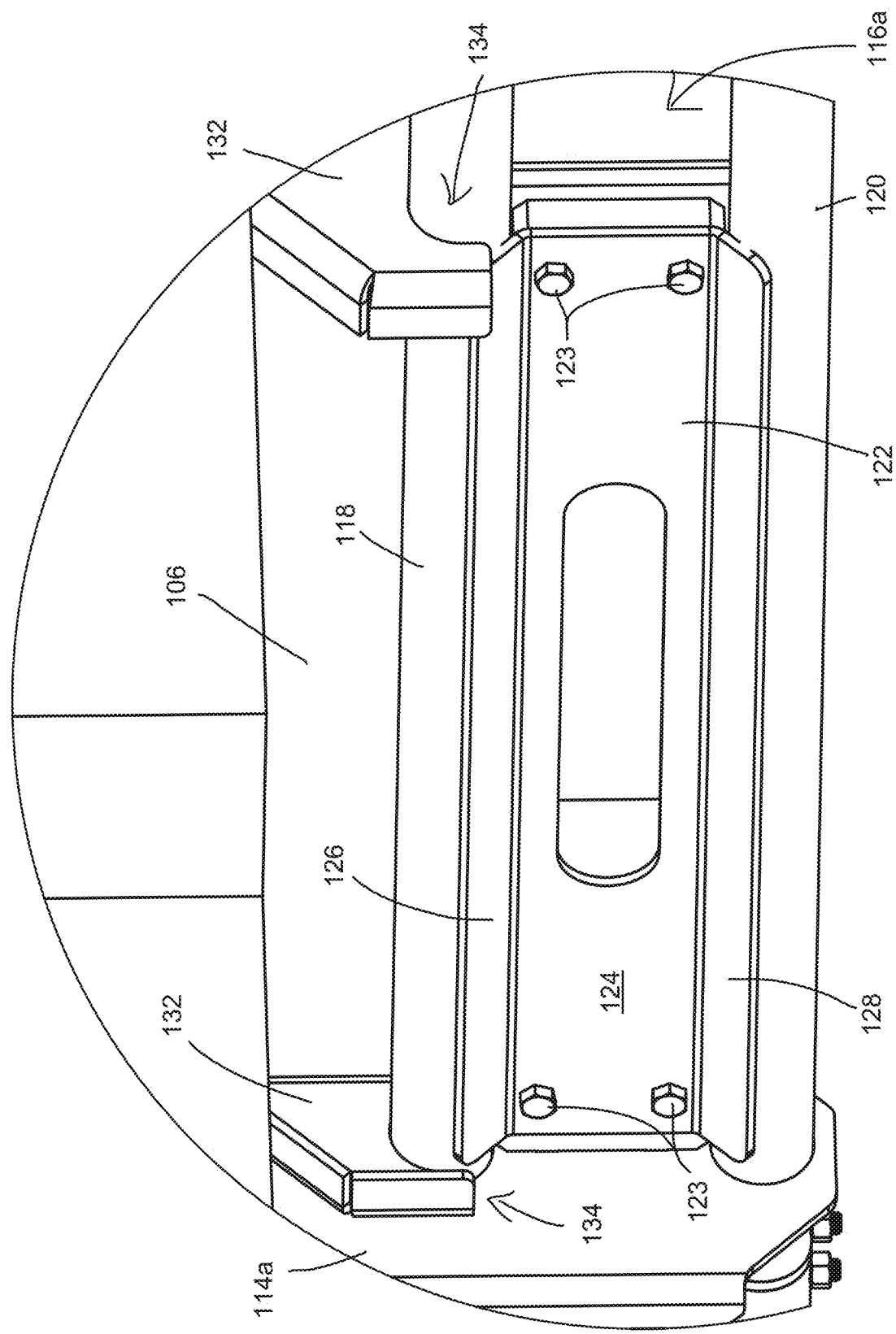
FIG. 9 is an enlarged view of the region designated IX in FIG. 8.
Figure 13:
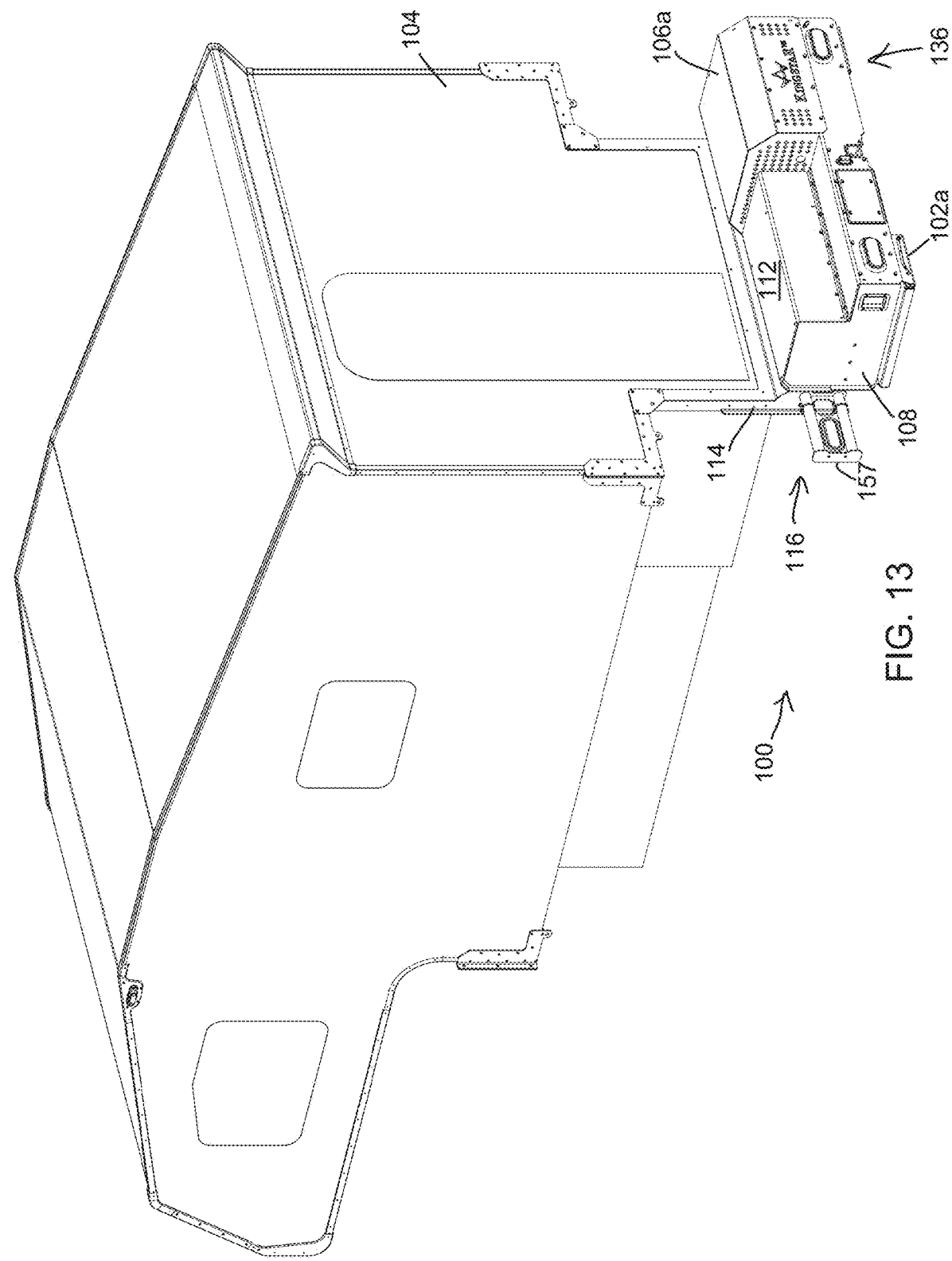
FIG. 13 is a left-rear perspective view of the support platform and truck camper of FIG. 2, depicted with another optional removable accessory including a deployable stair system, in accordance with an embodiment of the present invention, and depicted with the stair system in a stowed configuration.

As best shown in FIGS. 8 and 9, the coupling bracket 122 includes a body formed of an elongate rectangular plate 124 that has a width of about equal to the distance of the gap 116a between the upper and lower support rails 118, 120. An upper wing 126 is coupled to an upper edge of the rectangular plate 124 and extends upward at an oblique angle from the rectangular plate 124 (FIGS. 5 and 9). A lower wing 128 is coupled to a lower edge of the rectangular plate 124 and extends downward at an oblique angle from the rectangular plate 124 in the same direction as the upper wing 126. The upper wing 126 and lower wing 128 each have a length about equal to the rectangular plate 124. With the coupling bracket 122 fastened to the front of the stair system 102, an upper or upward facing surface 126a of the upper wing 126 engages or mates against a lower, forward portion of the upper support rail 118 and a lower or downward facing surface 128a of the lower wing 128 engages or mates against an upper, forward portion of the lower support rail 120 (FIG. 5).

As fasteners 123 are tightened to draw the coupling bracket 122 toward the front of the stair system 102, the angled surfaces 126a and 128a mate with or press against the respective support rails 118 and 120 generating a wedging effect to wedge the coupling bracket 122 between the rails 118 and 120. Thus, along with the wedging effect, the coupling bracket 122 and stair system 102 cooperate to clamp onto the rails 118 and 120. The wedging of the coupling bracket 122 and clamping of the bracket 122 and stair system 102 counteract, resist, or substantially eliminate rotation of the stair system 102 relative to the rail system 116 and also counteract vibration that may be caused by movement of the stair system 102 relative to the rail system 116. Optionally, and as illustrated in FIG. 5, a front portion of the stair system 102 (or any removable accessory) may include an extension or tab portion 130 that extends between the upper and lower support rails 118. The tab portion 130 may further counteract, resist, or substantially eliminate rotation of the stair system 102 relative to the rail system 116 and also counteract vibration between the stair system 102 and rail system 116.

A universal accessory mounting device, in the form of a single rail hanger 132, is provided at each outboard end of the lower, front portion of the cabinet 106 to couple the cabinet to the platform 100 (FIGS. 1, 8, and 9). Each hanger 132 includes a rail engagement element in the form of a grip or hook 134 for engaging the upper support rail 118 for at least temporarily suspending the cabinet from the rail system 116. When the cabinet 106 is coupled to the rail system 116, the hook 134 extends over the top of and partially in front of the upper support rail 118 to releasably engage the upper support rail 118. The hanger 132 and coupling bracket 122 cooperate to counteract, resist, or substantially eliminate rotation of the cabinet 106 relative to the rail system 116. It will be appreciated that without the coupling bracket 122 attached to the cabinet 106, the cabinet 106 may be readily removed from the rail system 116 by lifting and/or tilting the cabinet 106 to disengage the hook 134 from the upper rail 118. It will also be appreciated that the hook 134 may be configured to engage the lower rail 120 as opposed to the upper rail 118. Optionally, the hanger 132 may include a pair of hooks for engaging both the upper and lower rail 118 and 120, such as similar to hangers 138 illustrated in FIGS. 14 and 15, and as described in further detail below, for example.

Referring to the illustrative embodiment of FIGS. 13-20, a removable multi-function accessory 136 is provided for mounting to a rear portion of the rail system 116 of accessory support platform 100. The accessory 136 includes a unitary body that supports a single deployable stair 102a, a storage cabinet 106a, an access platform 112, a left side slideable storage drawer 108 that slideably nests within access platform 112, a right side slideable storage drawer 108a (see FIG. 17) that slideably nests within storage cabinet 106a, and, optionally, a clothing closet 110 (see FIGS. 18-20). The deployable stair 102a, storage cabinet 106a, access platform 112, drawer 108, drawer 108a, and closet 110 may be configured similar or substantially identical in structure and function to corresponding structures described in previously referenced U.S. patent application Ser. No. 17/100,004, now U.S. Pat. No. 11,840,197, issued Dec. 12, 2023.

Figure 14:
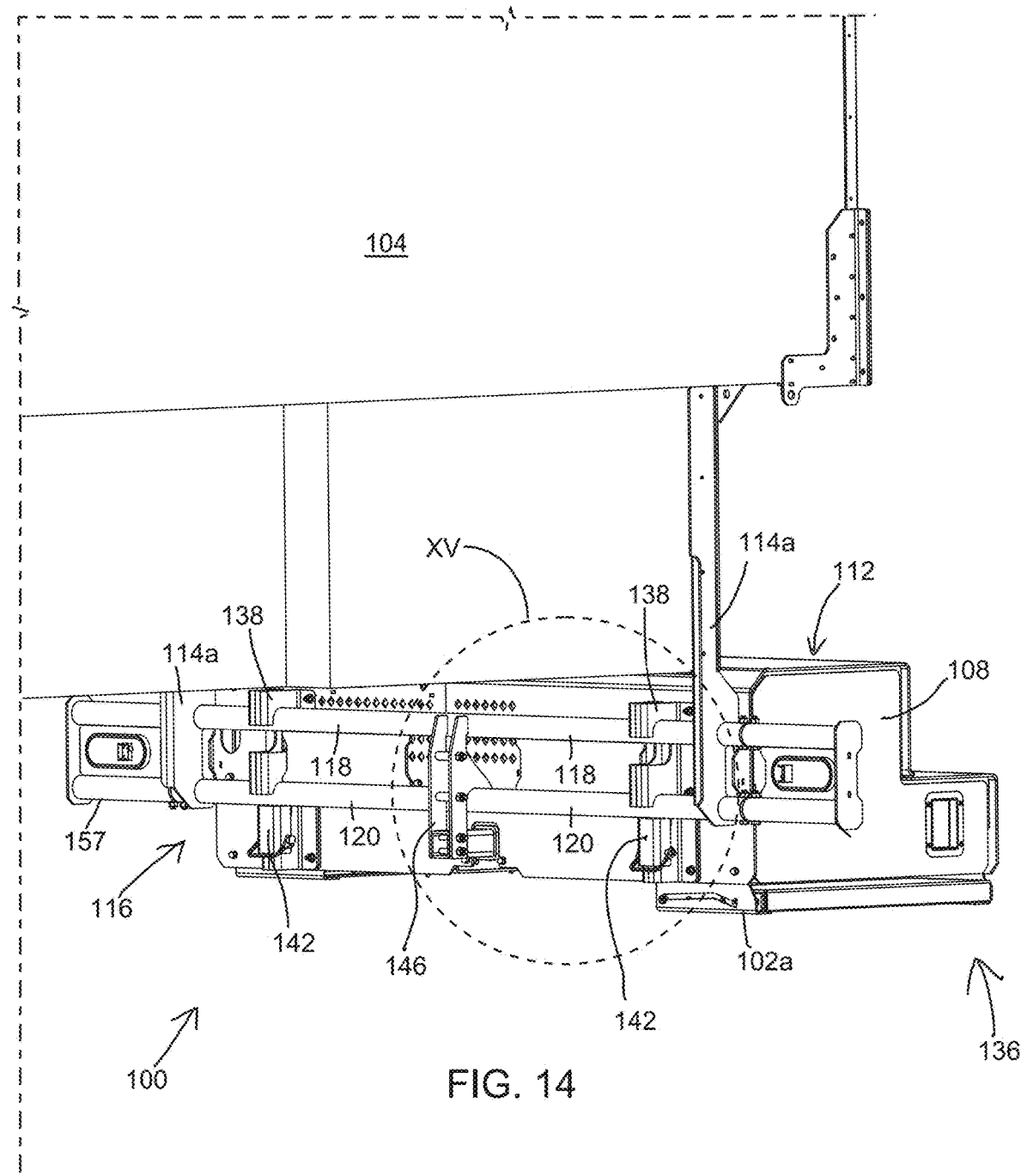
FIG. 14 is a left-front perspective view of the support platform and truck camper of FIG. 13.
Figure 15:
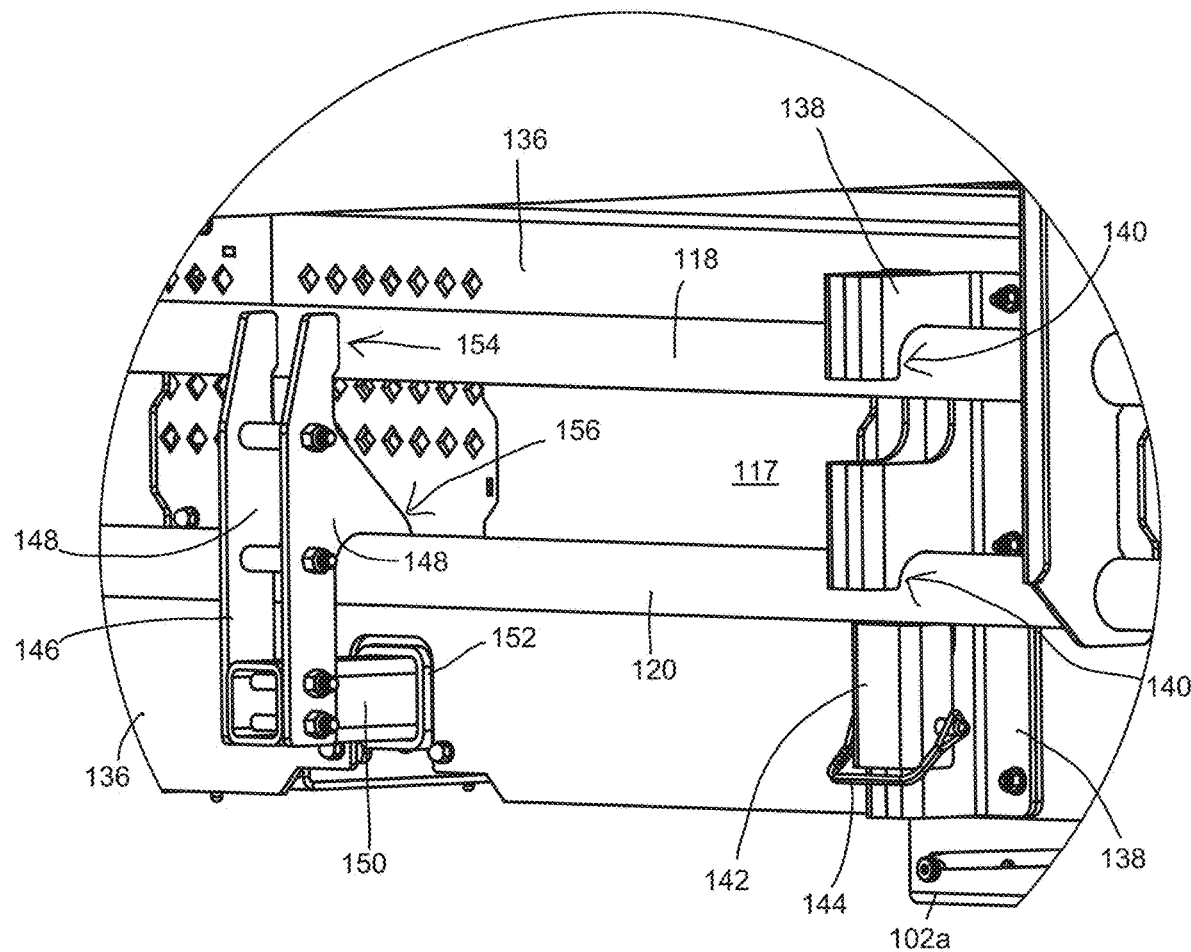
FIG. 15 is an enlarged view of the region designated XV in FIG. 14.
Figure 17:
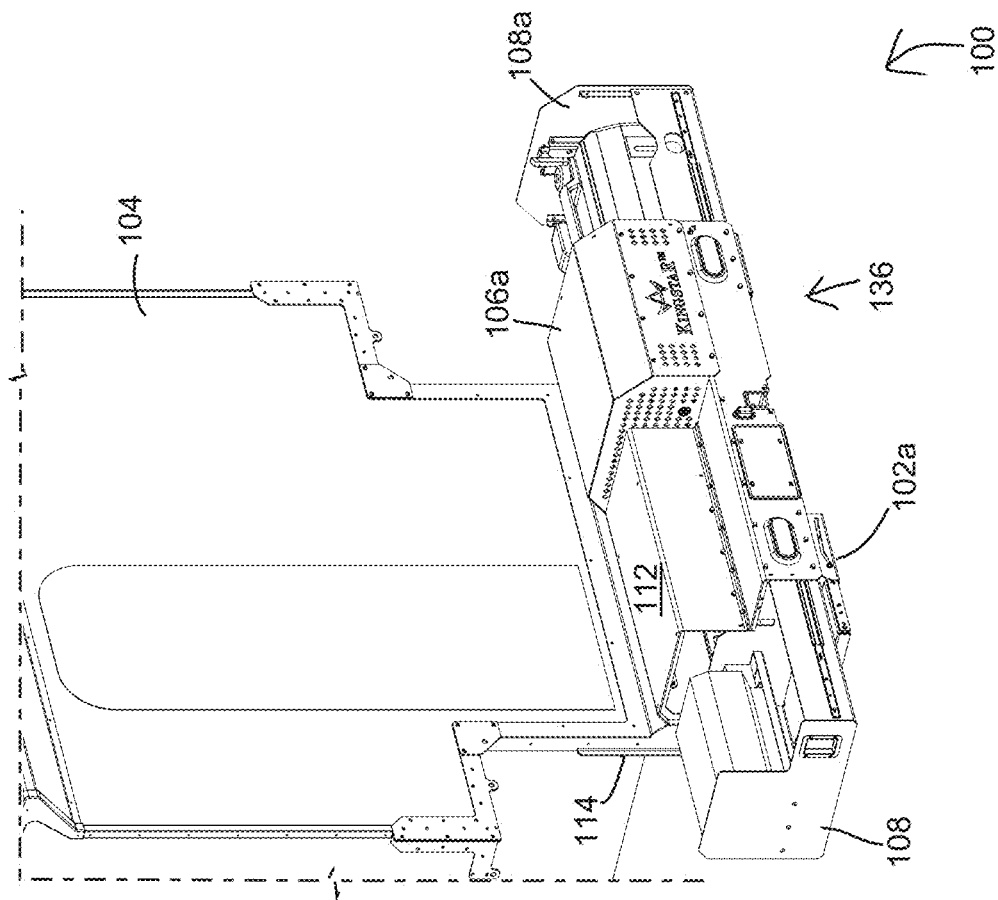
FIGS. 16 and 17 are left-rear perspective views of the support platform and truck camper of FIG. 13, depicted with the deployable stair frame in a deployed configuration and depicting sequential steps of deploying a slideable drawer from a left-side access platform and deploying a slideable drawer from a right-side storage unit.
Figure 16:
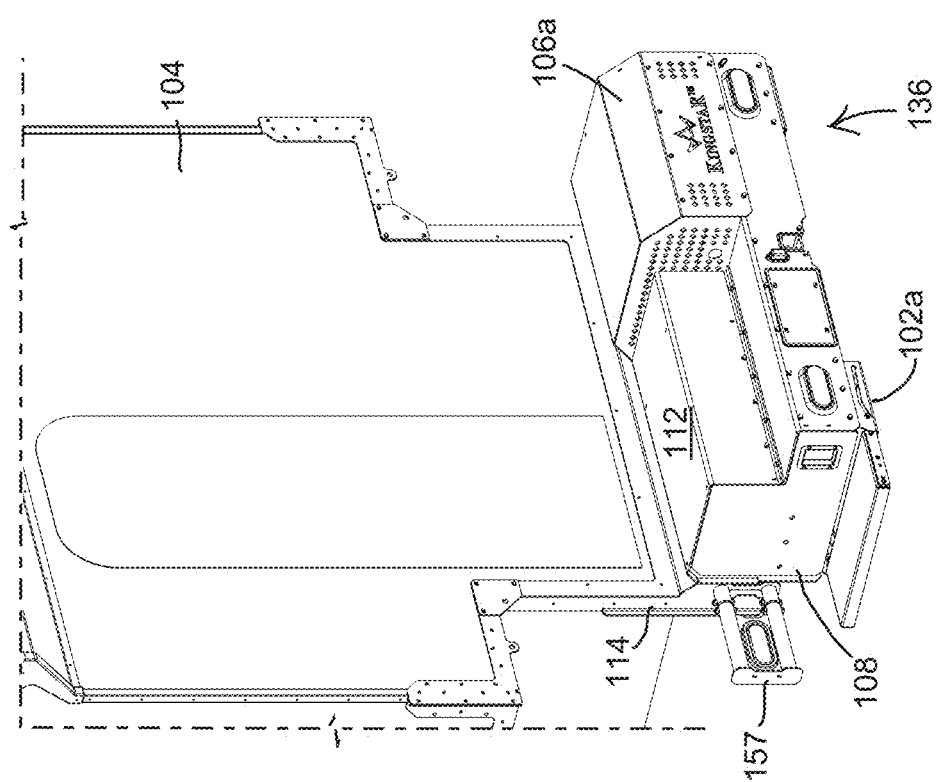
Figure 18:
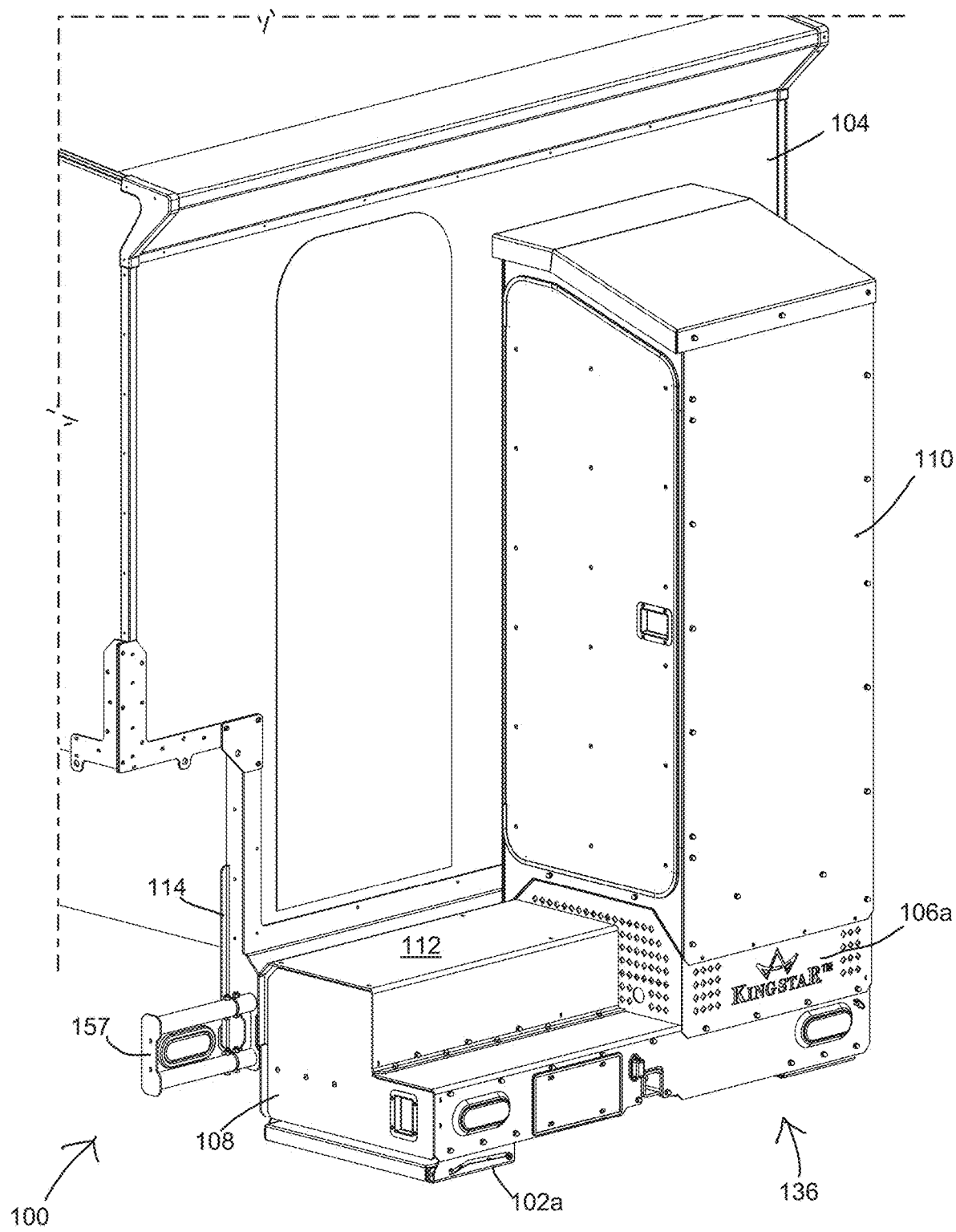
FIG. 18 is a left-rear perspective view of the support platform and truck camper of FIG. 13, depicted with an optional clothing closet and with the deployable stair system in a stowed configuration.
Figure 20:
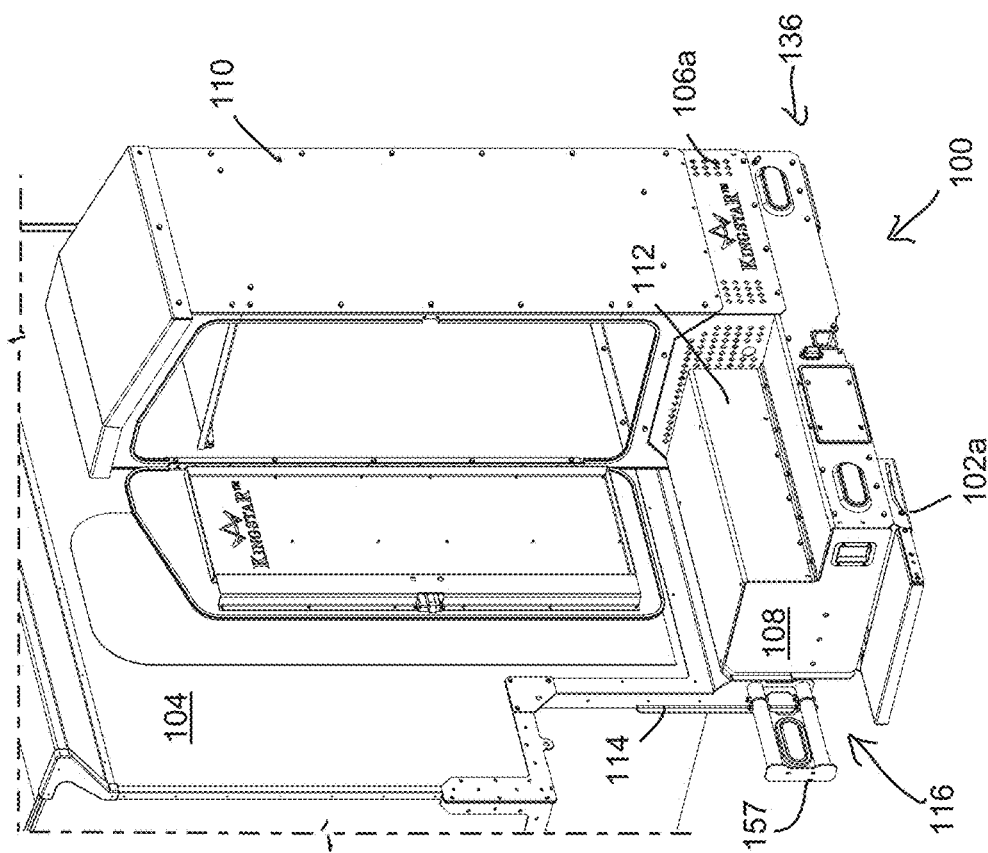
FIGS. 19 and 20 are left-rear perspective views of the vehicle mounted accessory of FIG. 18, depicted with the deployable stair frame in a deployed configuration and depicting sequential steps of opening a door of the clothing closet.
Figure 19:
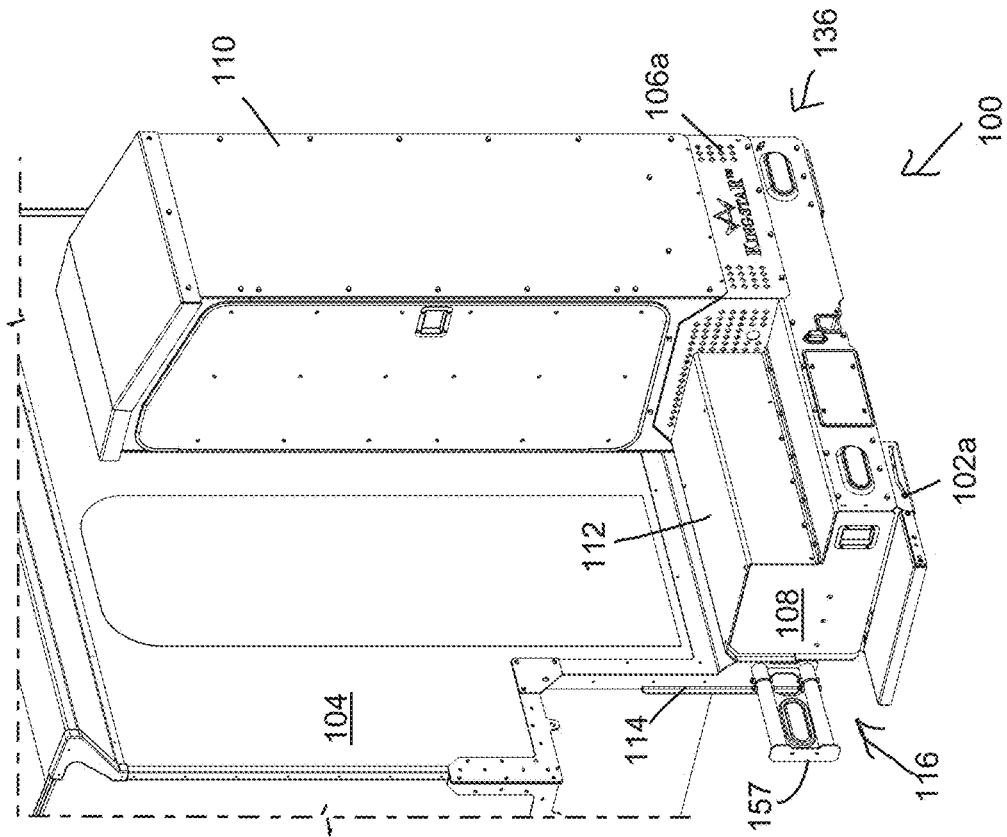

A universal accessory mounting device, in the form of a dual-rail hanger 138, is provided at each outboard end of the front portion of accessory 136 to couple it to the platform 100 (FIGS. 14 and 15). Each dual-rail hanger 138 includes a pair of rail engagement elements in the form of grips or hooks 140 for engaging each of the upper support rail 118 and the lower support rail 120 for at least temporarily suspending the accessory 136 from the rail system 116. When the accessory 136 is coupled to the rail system 116, an upper one of the hooks 140 extends over the top of and partially in front of the upper support rail 118 to releasably engage the upper support rail 118, and a lower one of the hooks 140 extends over the top of and partially in front of the lower support rail 120 to releasably engage the lower support rail 120. A lock, in the form of a u-bracket 142, is releasably coupled to a lower portion of the hanger 138 to lock or secure the hanger 138 at the rail system 116. When installed on hanger 138, the u-bracket 142 abuts a lower portion of the lower rail 120 to prevent the hanger 138 from raising or lifting relative to the rail system 116. The u-bracket 142 is coupled to the hanger 138 with a hitch safety pin 144. It will be appreciated that without the u-bracket 122 installed to the hanger 138, the hanger 138 may be readily removed from the rail system 116 by lifting and subsequently rearwardly sliding the accessory 136 away from the truck camper 104 to disengage the hooks 140 from the respective support rails 118 and 120.

A stabilizer 146 is provided at a center, forward portion of the accessory 136 (FIGS. 14 and 15). The stabilizer 146 includes a pair of spaced apart brackets or plates 148 that are coupled at proximal ends to respective sides of a hitch tube adapter 150, such as with mechanical fasteners (FIG. 15). The tube adapter 150 is dimensioned to be received inside a hitch receiver tube 152 at a lower center portion of the accessory 136. The brackets 148 are spaced apart from and coupled to one another, such as with bolts, nuts, and spacers. Each bracket 148 includes an upper extension or counterbalance support 154 at the distal end of the bracket 148 and a rail engagement element, in the form of a grip or hook 156, at a medial portion of the bracket 148. When stabilizer 146 is installed, the upper extension 154 abuts or presses against a front portion of the upper support rail 118. Likewise, when stabilizer 146 is installed, the hook 156 extends over the top of and partially behind the lower support rail 120 to releasably engage the lower support rail 120. The dual-rail hangers 138 and stabilizer 146 cooperate to counteract, resist, or substantially eliminate rotation of accessory 136 relative to the rail system 116. Optionally, the stabilizer 146 may be installed with the platform 100 after the accessory 136 has been at least temporarily secured on the rail system 116. It will be appreciated that the stabilizer 146 may be omitted without substantially affecting the functionality and advantages of the platform 100 and removable accessory 136.

A removable accessory extension 157 is provided at each outboard end of the rail support system 116 (FIGS. 1-4, 6-8, 10-14, and 16-22). Each extension 157 includes an upper extension rail 158 coupled at a respective outboard end of the upper support rail 118 and a lower extension rail 160 coupled at the respective outboard end of the lower support rail 120. The removable extension 157 may support various rail mounted accessories or equipment, such as taillights 162, other commonly known indicator lights, or a reverse viewing camera, for example. It will be appreciated that the removable accessory extensions 157 may be omitted without substantially affecting the functionality and advantages of the platform 100 and rail support system 116. With the extensions 157 removed, other auxiliary accessories or equipment may be mounted directly to the outboard ends of the support rails 118 and 120, such as a fence panel, for example. For example, as illustrated in FIG. 23, a food grill 163 includes an upper and a lower horizontal support arm or rail 163a and 163b which are dimensioned and shaped such that they are receivable in the outboard end of support rail 118 and rail 120, respectively. As such, the food grill 163, or any other accessory, may be securely and removably supported from the outboard end of the support platform 100. It will be appreciated that other auxiliary accessories or equipment may be securely mounted or received in the outboard end of only one of the support rails 118 or 120 if the support from each of the rails 118 and 120 is unnecessary.

Figure 7:
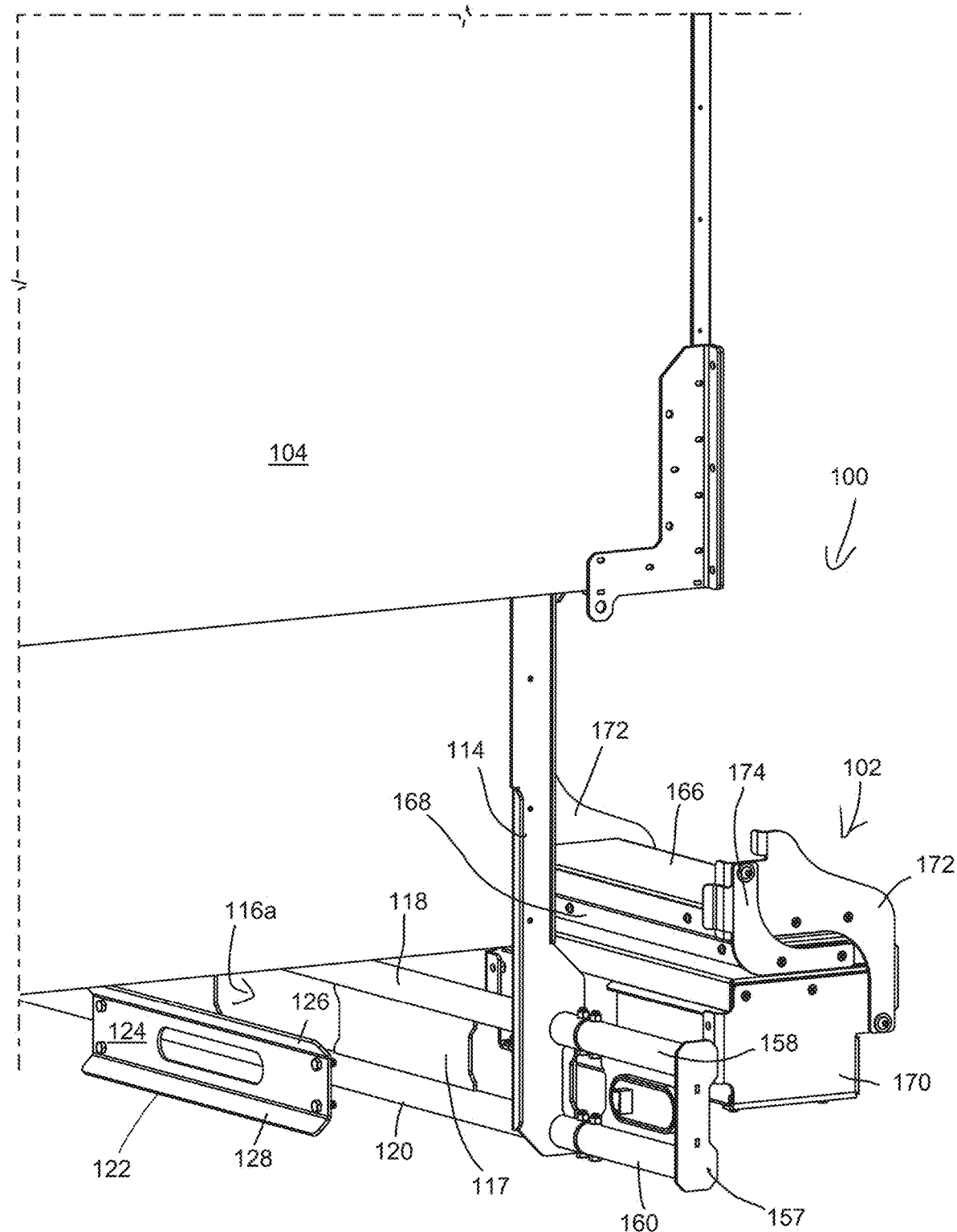
FIG. 7 is a partially exploded left-front perspective view of the support platform and truck camper of FIG. 1, depicted with the storage cabinet omitted.

As best illustrated in FIGS. 5, 7, 8, and 10-12, the deployable stair system 102 includes a first fixed stair tread 164 that is fixed relative to support rail system 116, a second stair tread 166 that is pivotable or foldable relative to the first tread 164, and a third stair tread 168 that is pivotable or foldable relative to the second tread 166. The pivotable treads 166 and 168 are extendable between a deployed position or configuration providing a set of stair steps to access the door 104a of the truck camper 104, as shown in FIGS. 5 and 12, and a stowed position or configuration in which the stair treads 164, 166, and 168 are alongside one another, as shown in FIGS. 7 and 10. In the deployed configuration, the stair treads 164, 166, and 168 are spaced apart from one another. The first tread 164 is supported at a first tread stringer frame 170 that is coupled in a fixed orientation to the support rail system 116 (FIG. 5). The second stair tread is supported at a second tread stringer frame 172 having a first pivot arm pivotably coupled at its distal end to a rearward, distal portion of first frame 170 (FIGS. 5 and 10-12). The third stair tread is supported at a third tread stringer frame 174 having a pivot arm pivotably coupled at its distal end to a distal portion of a second arm of the second frame 172 (FIGS. 5, 7, and 10-12. A stop 176 (FIG. 5) is coupled with the first pivot arm of second frame 172 to abut a lower, rearward portion of the first frame 170 to support and retain the second stair 166 in the deployed configuration. A stop 178 (FIG. 5) is coupled with the pivot arm of third frame 174 to abut a distal portion of the second pivot arm of the second frame 172 to support and retain the third stair 168 in the deployed configuration. The second tread 166 and third tread 168 deploy by pivoting together away from the first tread 164 (see sequence between FIGS. 10 and 11), and the third tread 168 deploys further by pivoting away from the second tread 166 (see sequence between FIGS. 11 and 12).

Figure 21:
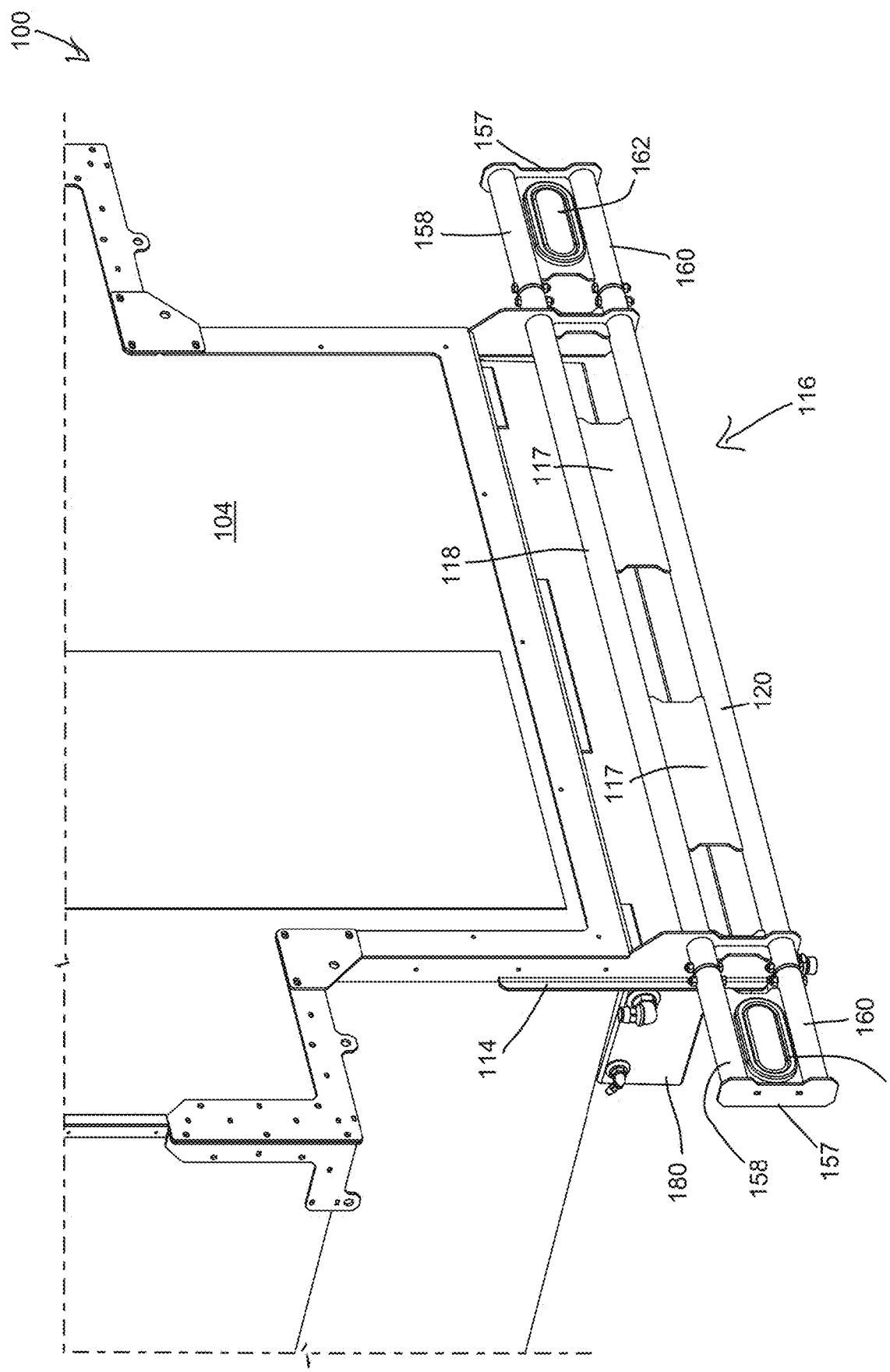
FIG. 21 is a left-rear perspective view of the support platform and truck camper of FIG. 2, depicted with an optional adjacent water storage tank, in accordance with an embodiment of the present invention.
Figure 22:
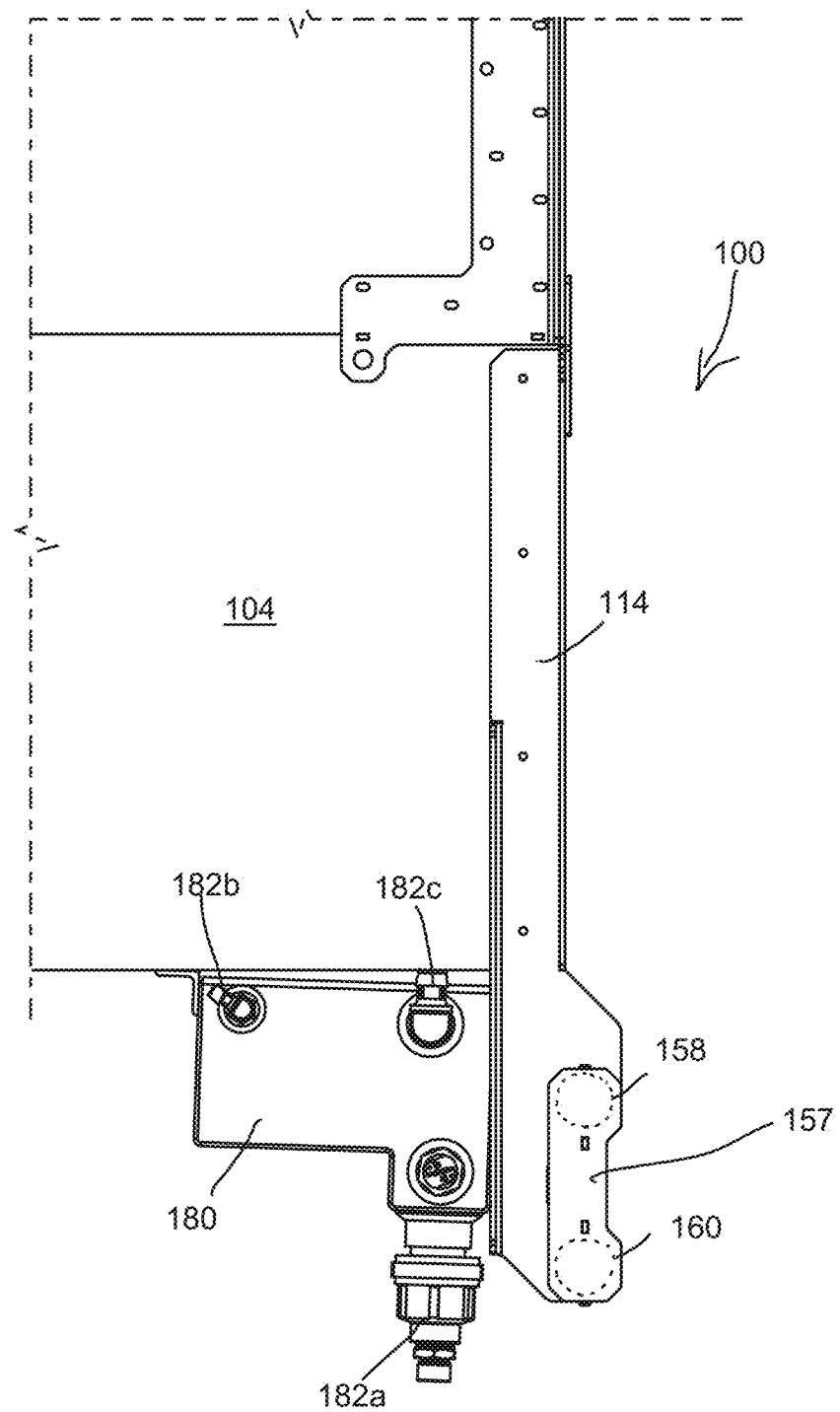
FIG. 22 is an enlarged left side elevation view of the support platform, truck camper, and water storage tank of FIG. 21.
Figure 23:
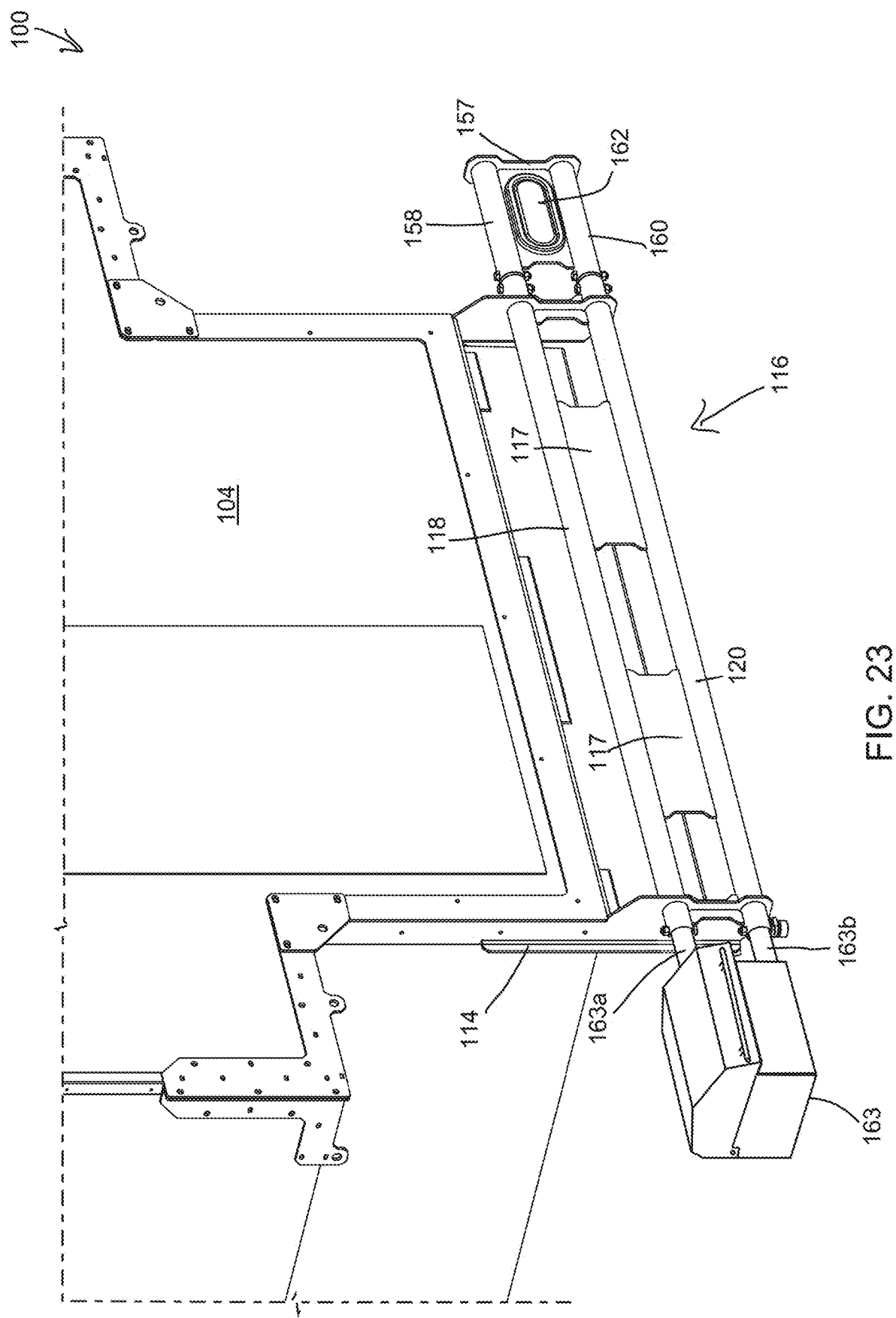
FIG. 23 is a left-rear perspective view of the support platform and truck camper of FIG. 2, depicted with an auxiliary accessory food grill coupled to an outboard end of the platform, in accordance with an embodiment of the present invention.

Referring to the illustrative embodiment of FIGS. 21 and 22, a water tank 180 is provided at the lower rear portion of the truck camper 104. The water tank 180 is positioned adjacent to the support platform 100 and may or may not be coupled to the support platform 100. The water tank 180 may be utilized for storing fresh water for use in or near the truck camper 104, or the water tank 180 may be utilized for waste water collection, such as for collecting and storing grey or black water. The water tank 180 includes several inlet/outlet fittings 182a, 182b, and 182c for filling/discharging water stored in the tank.

Figure 24A:
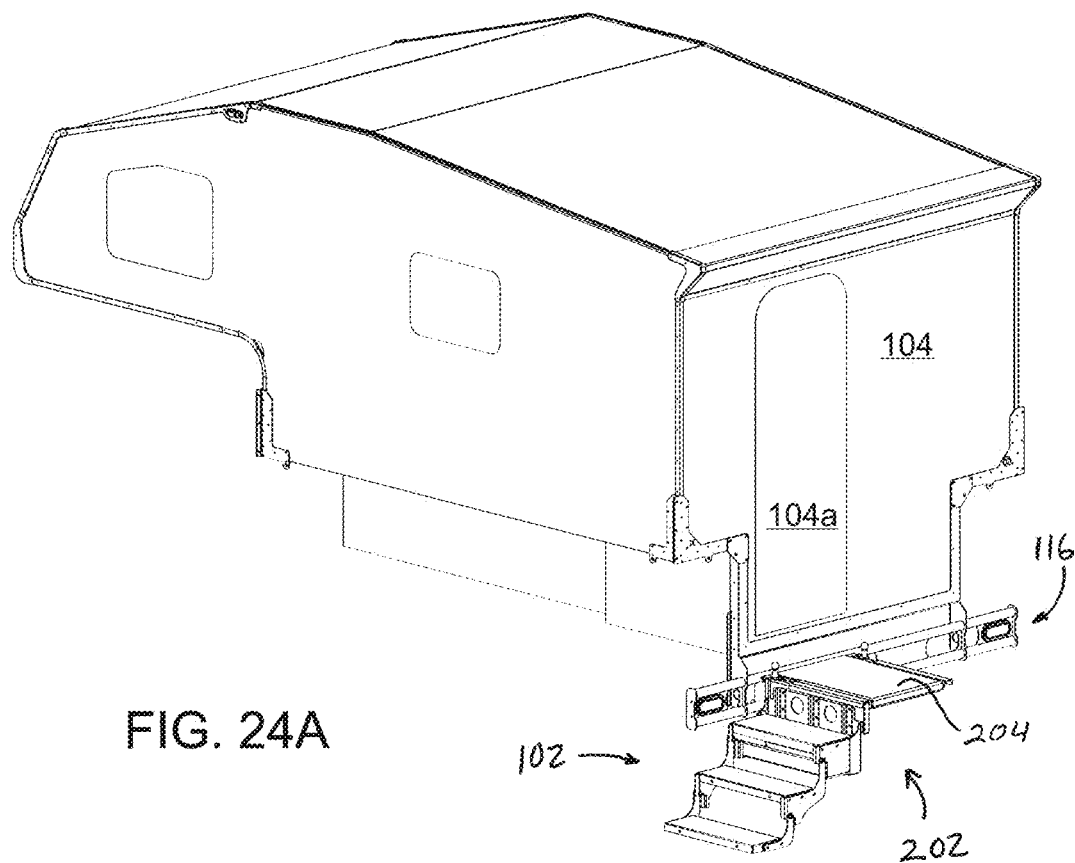
FIGS. 24A and 24B are left-rear perspective views of the vehicle mounted accessory support platform, shown mounted to a rear of a truck-bed mounted camper unit and fitted with a swiveling staircase unit shown in the deployed and stowed configurations, respectively.
Figure 24B:
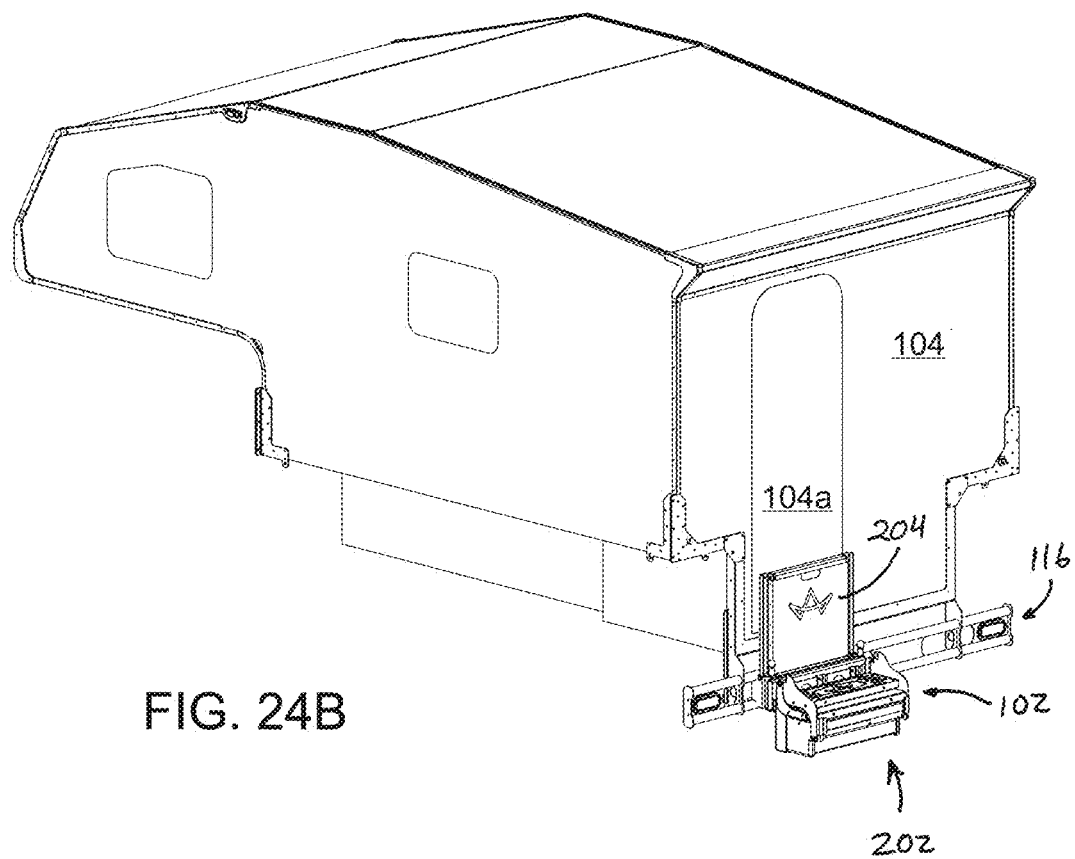
Figure 25:
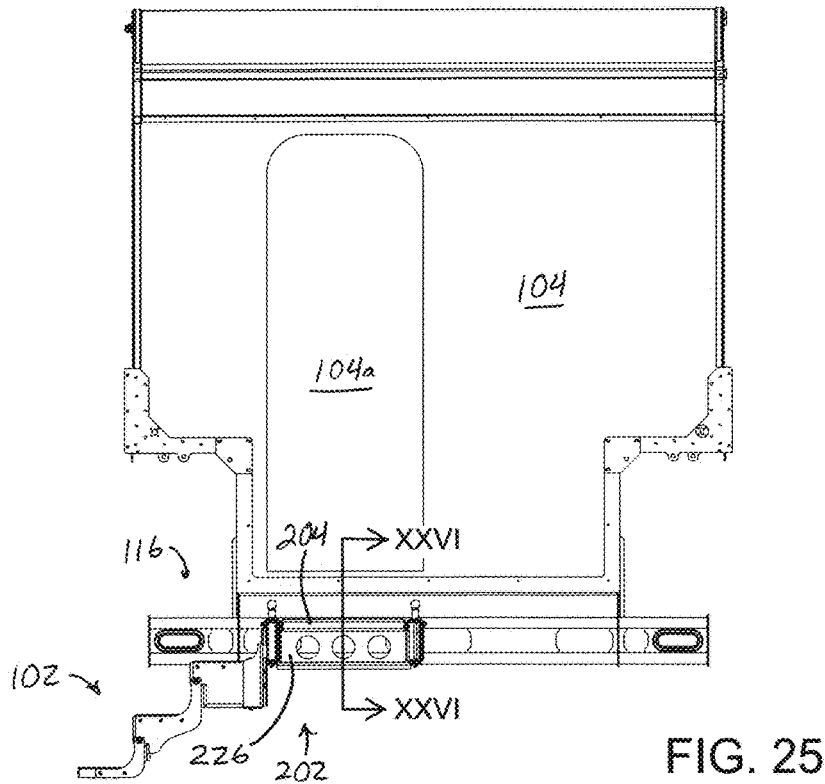
FIG. 25 is a rear elevation view of the accessory support platform, truck-bed mounted camper unit, and deployed swiveling staircase of FIG. 24A.
Figure 29A:
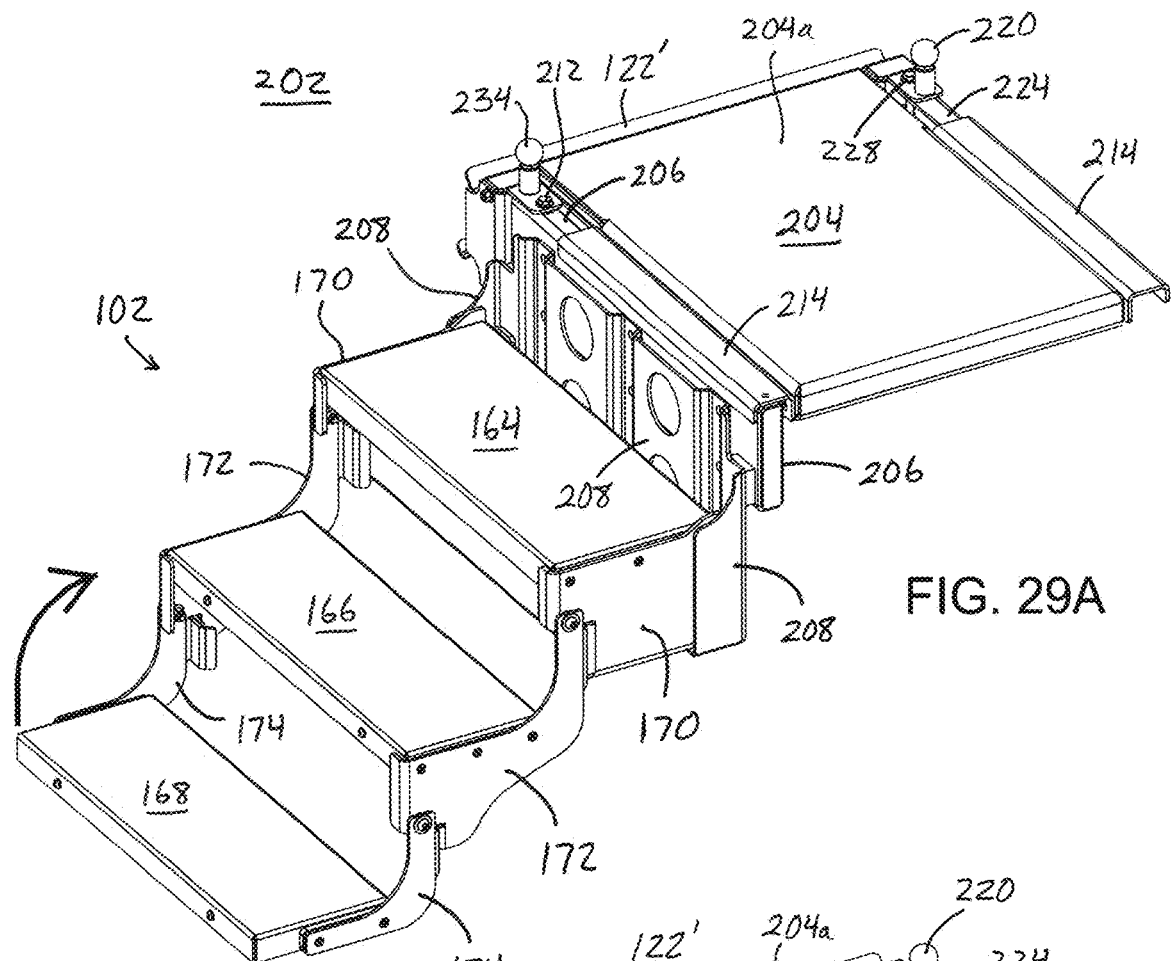
FIGS. 29A-29G are a series of left-rear perspective views of the swiveling staircase unit of FIGS. 24A and 24B, depicting sequential steps of converting from the deployed configuration to the stowed configuration.
Figure 29B:
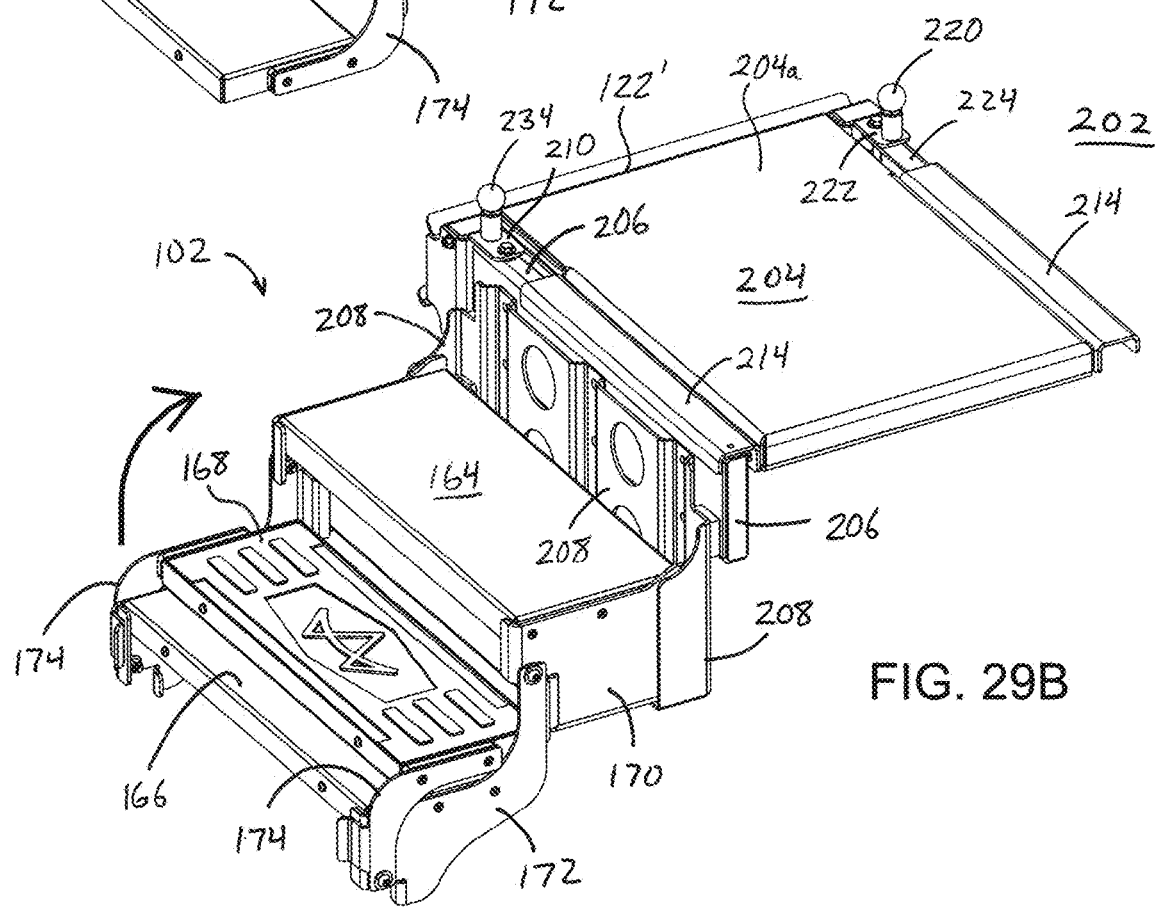
Figure 29C:
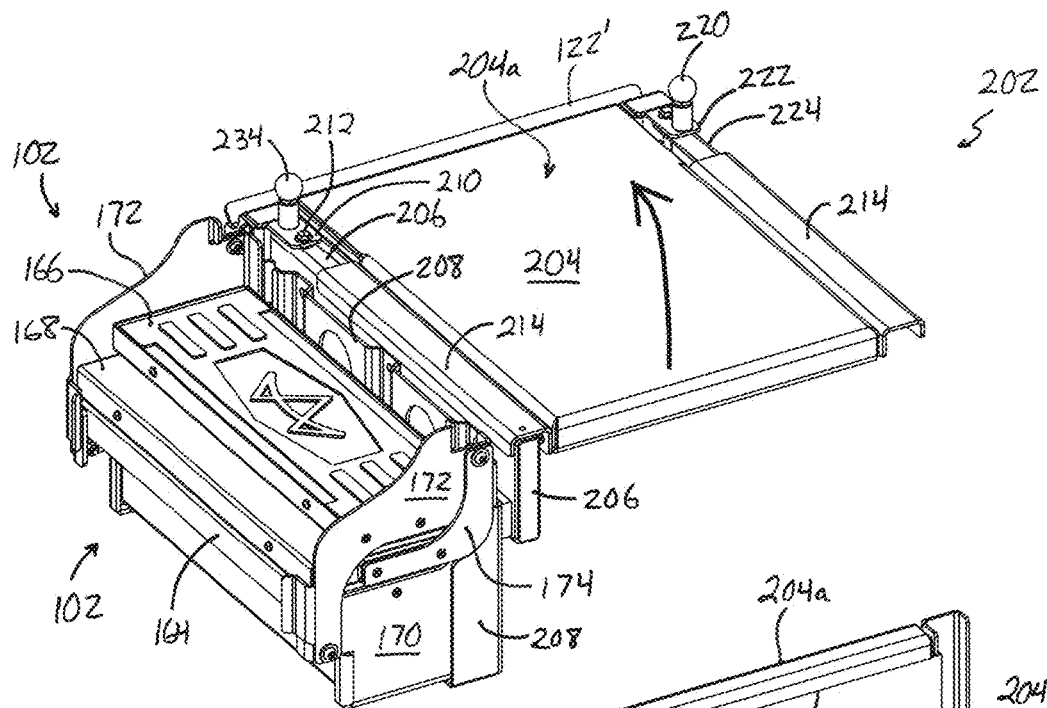
Figure 29D:
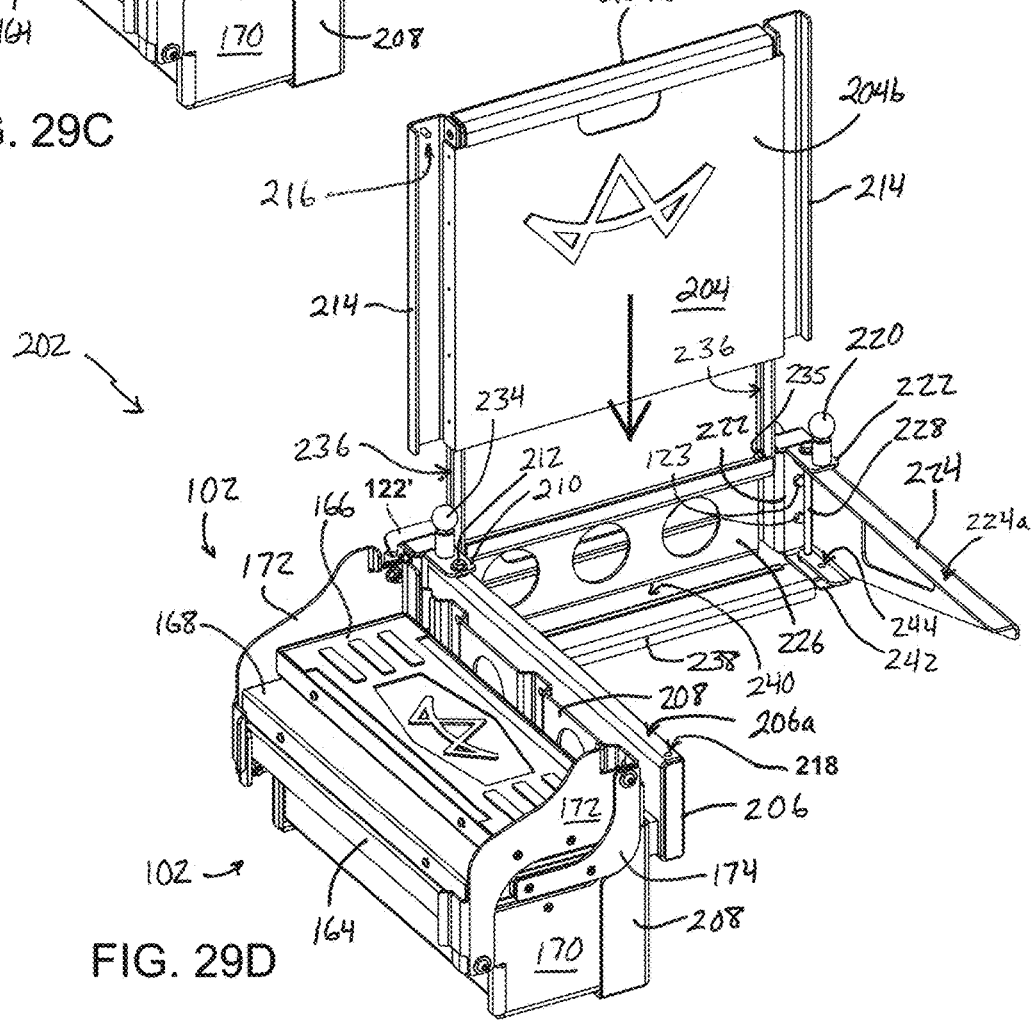

Additional accessories are envisioned that are mountable to the support platform 100, such as a swiveling staircase 202 with deployable platform 204 such as shown in FIGS. 24A and 24B. Swiveling staircase 202 utilizes the same deployable stair system 102 as described above, which is mounted to a pivotable stair-mount frame 206 rather than being mounted directly to the upper and lower support rails 118, 120 by coupling bracket or backing plate 122. Referring to FIGS. 29A-29G, a stair bracket 208 secures first frame 170 to pivotable stair-mount frame 206. The vertical mounting position of first frame 170 may be adjustable along stair bracket 208 using fasteners such as threaded bolts fitted with hand-operated knobs, so that the height of stair system 102 may be adjusted according to user preference. Stair-mount frame 206 is pivotably coupled to a pivot bracket 210 by a vertical pivot pin 212, so that stair-mount frame 206 and deployable stair system 102 can be pivoted together about a vertical pivot axis defined through pin 212 between an extended position that is substantially perpendicular to support rails 118, 120 (FIGS. 24A and 29A-29F), and a retracted position that is substantially parallel to support rails 118, 120 (FIGS. 24B and 29G).

Figure 28:
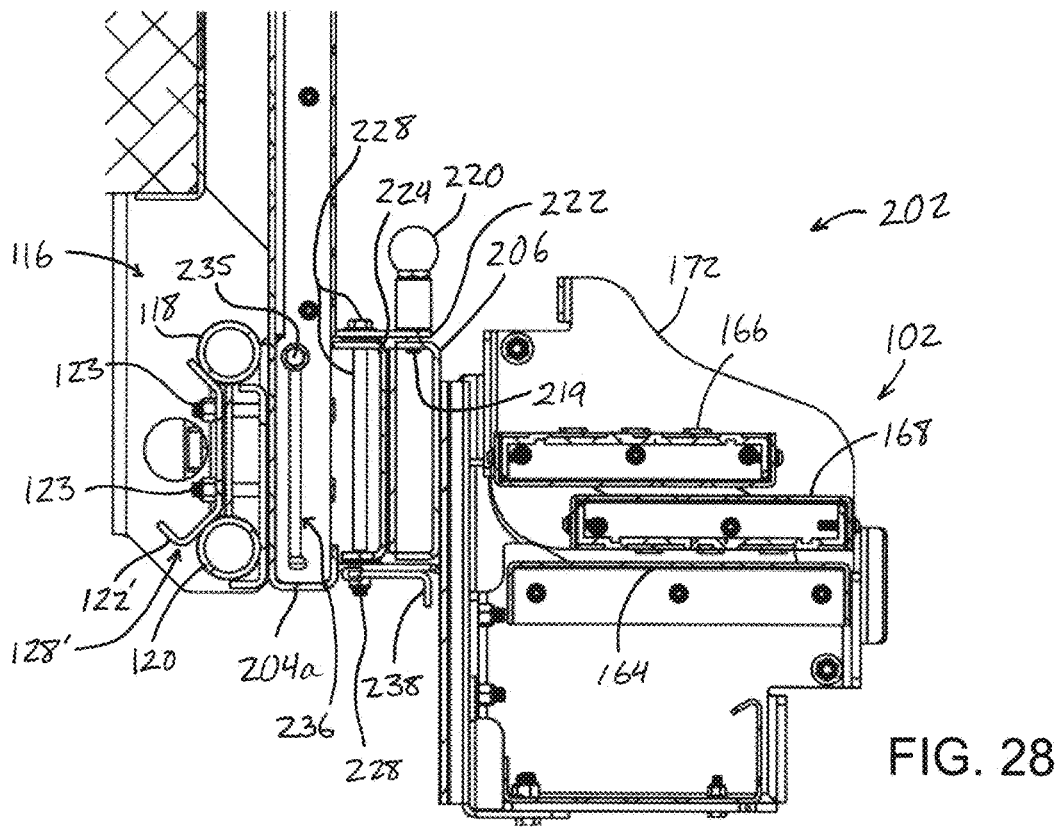
FIG. 28 is a side sectional view taken along Line XXVIII-XXVIII of FIG. 25.

An upper elongate surface 206a of stair-mount frame 206 is sized and shaped to be received in an elongate channel piece 214 positioned alongside deployable platform 204, which secures stair-mount frame 206 in the extended position. A downwardly-extending stabilizing pin 216 (FIGS. 29D-29G) is located at a distal end of elongate channel piece 214, and is received in a bore 218 formed in a distal end of stair-mount frame 206, which aids in stabilizing platform 204 and stair-mount frame 206 relative to one another when platform 204 is lowered or deployed as shown in FIGS. 29A-29C. When stair-mount frame 206 and stair system 102 are pivoted to the stowed position of FIG. 29G, bore 218 receives a pin 219 (FIG. 28) that is manually retractable by pulling up on a knob 220 at another pivot bracket 222 on the opposite side of platform 204 from pivot bracket 210. The knob 220 and pin 219 may be spring-biased downwardly, or may be gravity-actuated to allow the pin 219 to drop into the bore 218 of stair-mount frame 206 when the frame 206 is fully retracted or stowed. Optionally, the pin 219 and bore 218 may be threaded so as to be fastenable together upon rotation of knob 220.

Pivot bracket 222 secures a pivotable platform support frame 224 to a main frame piece 226 via a vertical pivot pin 228. An upper surface 224a of support frame 224 is received by the aligned elongate channel piece 214 when deployable platform 204 is lowered, as can be seen by comparing FIG. 29C to FIG. 29D. Once stair-mount frame 206 is extended as shown in FIG. 29D, platform support frame 224 can be pivoted about a vertical pivot axis defined through pin 228 between an extended position that is substantially perpendicular to support rails 118, 120 (FIGS. 24A and 29A-29F), and a retracted position that is substantially parallel to support rails 118, 120 (FIGS. 24B and 29G). When platform support frame 224 is extended as shown in FIG. 29D, the pin associated with knob 220 extends down through a bore 230 (FIGS. 29F and 29G) formed in a proximal portion of platform support frame 224, to hold the support frame 224 in the extended position. A similar bore 232 (FIG. 29G) is formed at a proximal end of the pivotable stair-mount frame 206 and when frame 206 is extended, bore 232 receives a downwardly-extending pin associated with another knob 234 located on pivot bracket 210 and adjacent vertical pivot pin 212. This causes the pin of knob 234 to maintain frame 206 and stair system 102 in the extended position even while platform 204 is raised or retracted.

Figure 26:
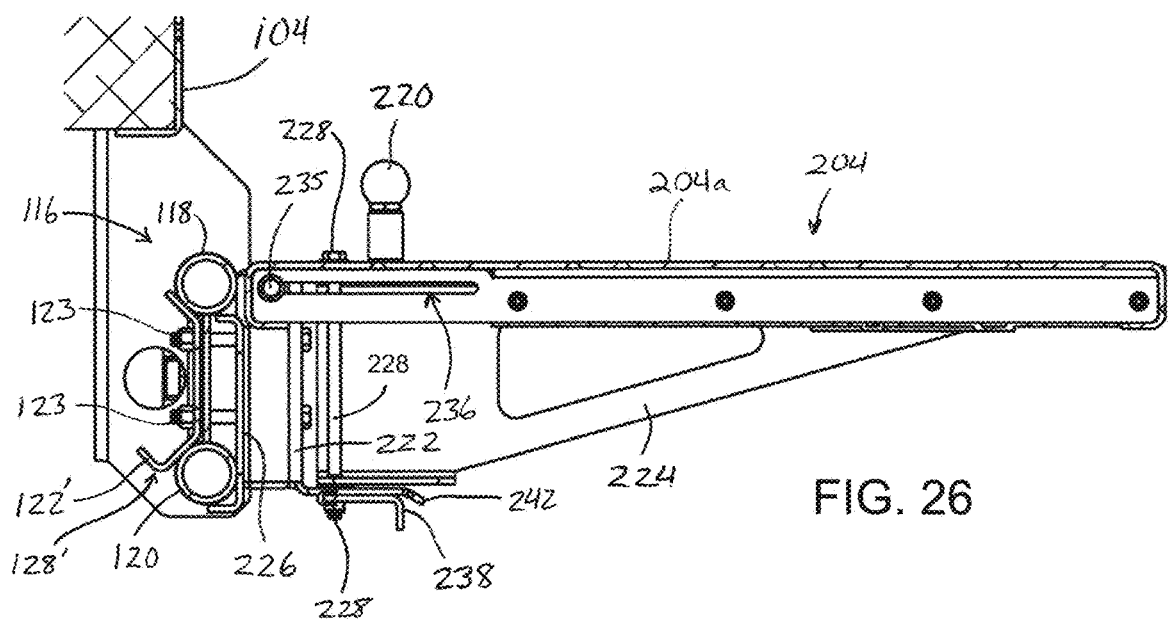
FIG. 26 is a side sectional view taken along line XXVI-XXVI of FIG. 25.
Figure 27:
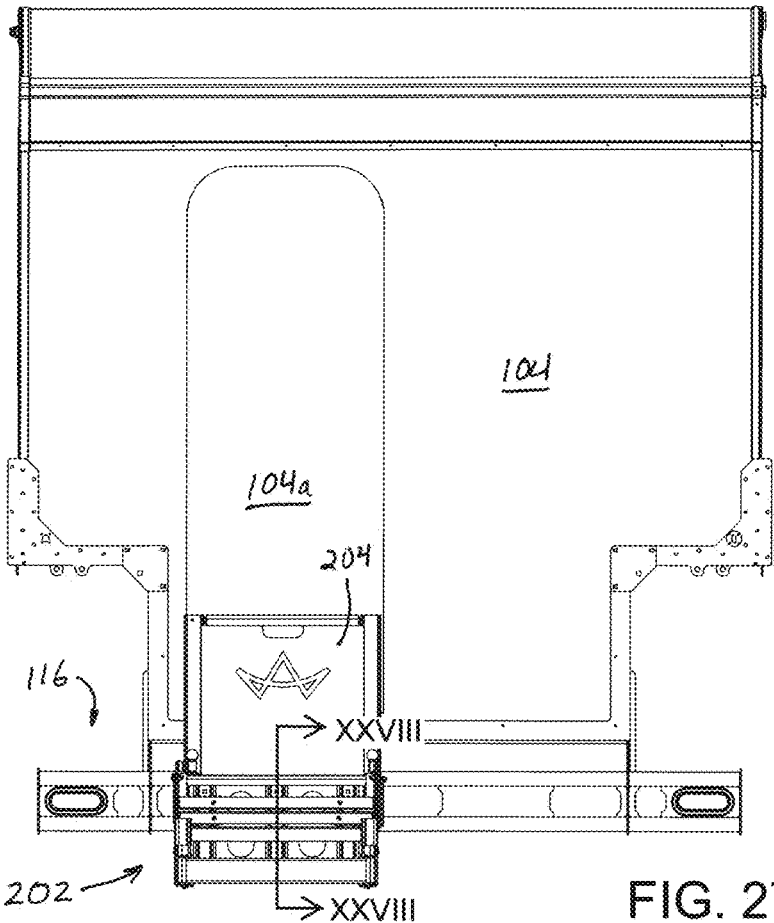
FIG. 27 is a rear elevation view of the accessory support platform, truck-bed mounted camper unit, and stowed swiveling staircase of FIG. 24B.
Figure 29E:
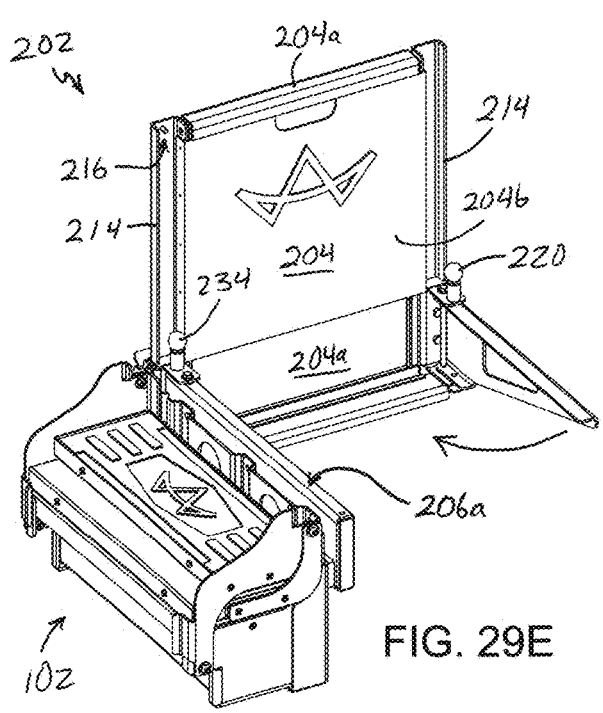
Figure 29F:
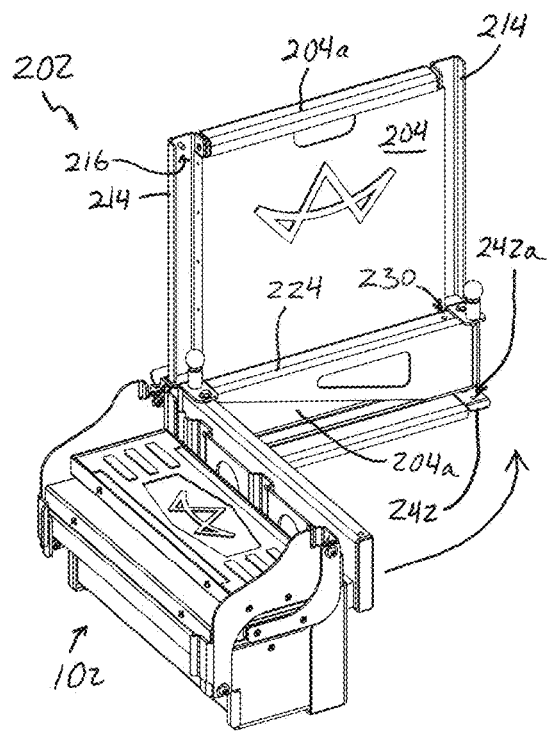
Figure 29G:
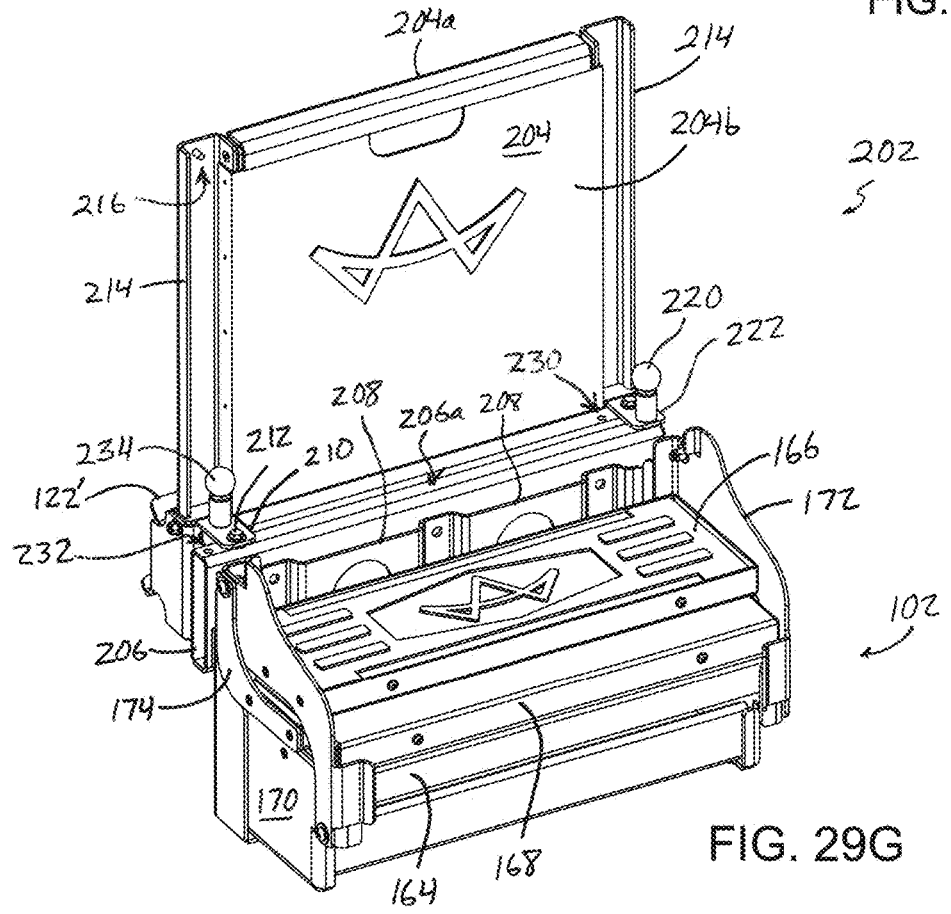

Deployable platform 204 is both pivotable and extendable between its deployed position of FIGS. 24A and 29A-29C and its stowed position of FIGS. 24B and 29E-29G. Platform 204 includes a main upper panel 204a, a lower panel 204b, and the two elongate channel pieces 214 described above. A lateral stud 235 extends laterally inboard of each pivot bracket 210, 222 and passes through a respective elongate slot 236 formed at each side of main upper panel 204a at a proximal end thereof (FIGS. 26 and 29D). When platform 204 is in the deployed configuration of FIGS. 26 and 29C, the lateral studs 235 are located at proximal regions of the slots 236. When a user wishes to stow the platform 204, the distal end of the platform is pivoted upwardly to the upright or vertical orientation of FIG. 29D, and then lowered vertically to the position of FIG. 29F. During the vertical lowering movement the lateral studs 235 traverse downwardly through their respective slots 236 in the platform's main upper panel 204a, and the proximal region of main upper panel 204a moves downwardly alongside main frame piece 226. When platform 204 is lowered to its stowed position, it is prevented from falling away from main frame piece 226 and camper 104 by studs 235 and main frame piece 226, and then also by the pivotable platform support frame 224 once moved to its stowed position alongside the proximal portion of main upper panel 204a, as shown in FIG. 29F. Because platform 204 is aligned vertically alongside door 104a when platform 204 is stowed (FIG. 24B), platform 204 obstructs access to stair system 102 from inside camper 104 when swiveling staircase 202 is stowed.

Swiveling staircase 202 is secured to support rails 118, 120 by a coupling bracket or backing plate 122' that is secured by fasteners 123 to pivot brackets 210, 222 on either side of main frame piece 226, as shown in FIG. 26. The coupling bracket or backing plate 122' is substantially the same as the bracket or plate 122 described above, except that a lower wing 128' of backing plate 122' has an additional upwardly-angled portion extending away from lower support rail 120, as shown in FIGS. 26 and 28. A lower frame piece 238 extends between lower regions of each pivot bracket 210, 222, with an elongate gap 240 formed between an edge of lower frame piece 238 and a lower edge of main frame piece 226, as shown in FIG. 29D. A proximal edge portion of main upper panel 204a is received in gap 240 when platform 204 is moved to the stowed position, as shown in FIGS. 28 and 29E-29G.

Referring to FIGS. 29D-29F, a lower tab 242 of pivot bracket 222 extends below pivotable platform support frame 224. Lower tab 242 receives a lower portion of vertical pivot pin 228, which also passes through a lower region of support frame 224 as shown in FIG. 29D, and through an end region of lower frame piece 238. Thus, vertical pivot pin 228 secures lower frame piece 238, lower tab 242, and platform support frame to pivot bracket 222. A similar arrangement is present on the opposite side, secured by vertical pivot pin 212. Lower tab 242 defines a bore 242a (FIG. 29F) that aligns with a corresponding bore 244 formed in the lower region of platform support frame 224 when support frame 224 is extended as shown in FIGS. 29D and 29E. The alignment of bores 242a, 244 with support frame 224 extended allows for the optional insertion of a fastener or other securing device through the bores 242a, 244 to further secure support frame 224 in the extended position, if desired. Optionally, a bore formed in a lower distal end of stair-mount frame 206 aligns with bore 242a in lower tab 242 when frame 206 is moved to its stowed position of FIG. 29G, so that a fastener or other securing device may be inserted through the bores in lower tab 242 and stair-mount frame 206, to further secure stair-mount frame 206 in the stowed position, if desired.

The procedure for converting swiveling staircase 202 from the deployed configuration to the stowed configuration may be understood with reference to FIGS. 29A-29G. Typically the first procedure would be to collapse the second and third stair treads 166, 168 atop the first stair tread 164 as shown sequentially in FIGS. 29A-29C, in order to make deployable stair system 102 compact and provide better access to other components for the subsequent stowage procedures. However, collapsing the stair treads 166, 168 could be performed at any time in the overall stowage procedure. To allow the stair system 102, stair-mount frame 206, and platform support frame 224 to be pivoted to their stowed configurations, deployable platform 204 is pivoted upwardly about the lateral studs 235 (FIGS. 29C and 29D) so that elongate channel pieces 214 disengage the upper surfaces 206*a*, 224*a* of frames 206, 224 and then lowered down (FIGS. 29D and 29E) with slots 236 sliding along studs 235, so that platform 204 is secured in the upright stowed orientation. With platform 204 stowed as shown in FIG. 29E, knob 220 is manually lifted to raise pin 219 out of bore 230 in platform support frame 224 so that support frame 224 can be pivoted to its stowed position of FIG. 29F. Knob 234 is then manually lifted to raise the associated pin out of bore 232 in stair-mount frame 206 so that the stair-mount frame 206 can be pivoted to its stowed position of FIG. 29G. As the stair-mount frame 206 approaches its stowed position, pin 219 is lifted by knob 220 or by engagement with upper elongate surface 206*a* of stair-mount frame 206, and then is allowed to fall into the bore 218 formed in the distal end of stair-mount frame 206, which secures stair-mount frame 206 and stair system 102 in the stowed position of FIG. 29G. With stair-mount frame 206 and stair system 102 in the stowed position, platform support frame 224 and platform 204 are also retained in their stowed positions.

The procedure for converting swiveling staircase 202 from the stowed configuration to the deployed configuration is substantially the reverse order of steps for stowage, and may be understood with reference to FIGS. 29A-29G in reverse order. First, knob 220 is used to release pin 219 from the bore 218 in stair-mount frame 206 so that the frame 206 and stair system 102 may be swung outwardly to the deployed position of FIG. 29F. During this movement, the pin associated with knob 234 can be manually raised or will be forced upwardly by upper surface 206*a* of stair-mount frame 206. Once stair-mount frame 206 reaches the extended or deployed position, the pin of knob 234 will drop into bore 232 at the proximal end of stair-mount frame 206 to secure it in the extended position. Platform support frame 224 may then be freely swung out to its extended or deployed position of FIG. 29E, during which movement the pin 219 may be manually raised with knob 220, or pin 219 will be forced upwardly by upper surface 224*a* of platform support frame 224. Once platform support frame 224 is fully extended, pin 219 will drop into the bore 230 at a proximal end of frame 224 to secure it in the extended position. Platform 204 is then lifted so that slots 236 slide along studs 235 (compare FIG. 29D to FIG. 29E), and once the studs 235 reach the proximal ends of slots 236, platform 204 may be pivoted down so that channel pieces 214 of platform 204 rest atop the upper surfaces 206*a*, 224*a* of frames 206, 224, and stabilizing pin 216 is received in the bore 218 at the distal end of stair-mount frame 206 (FIG. 29C). Stair treads 166, 168 may then be deployed as shown in FIGS. 29B and 29A to complete the deployment procedure. Although not illustrated, it is envisioned that removable baluster posts may be fitted to the distal ends of frames 206, 224, beyond channel pieces 214 of platform 204, with the baluster posts supporting a chain or handrail between their upper ends when staircase 102 is deployed.

Other options envisioned for mounting accessories to support rail assembly or system 116 include a combination unit 302 including a staircase 304, a platform 306, and an equipment support 308 as shown in FIGS. 30A-34G. In the illustrated embodiment, equipment support 308 is shown as a kayak rack having a pair of flexible straps 310 mounted to a frame 312 that is secured to platform 306 and supporting a kayak 314. However, it should be appreciated that equipment support 308 is representative of substantially any equipment storage device, platform, or rack, such as a bicycle rack, a ski rack, a storage box, a vertical or horizontal panel for mounting or otherwise supporting various types of equipment, or the like. As will be appreciated with reference to FIGS. 34B-34F, platform 306 and its associated framework and components are substantially similar in their configuration and function to platform 204 and its associated framework described above, such that deployment of platform 306 may be readily understood with reference to the above descriptions and the accompanying drawings. Moreover, equipment support 308 attaches to platform 306 in substantially the same manner that deployable stair system 102 is incorporated into swiveling staircase 202, described above.

Figure 30A:
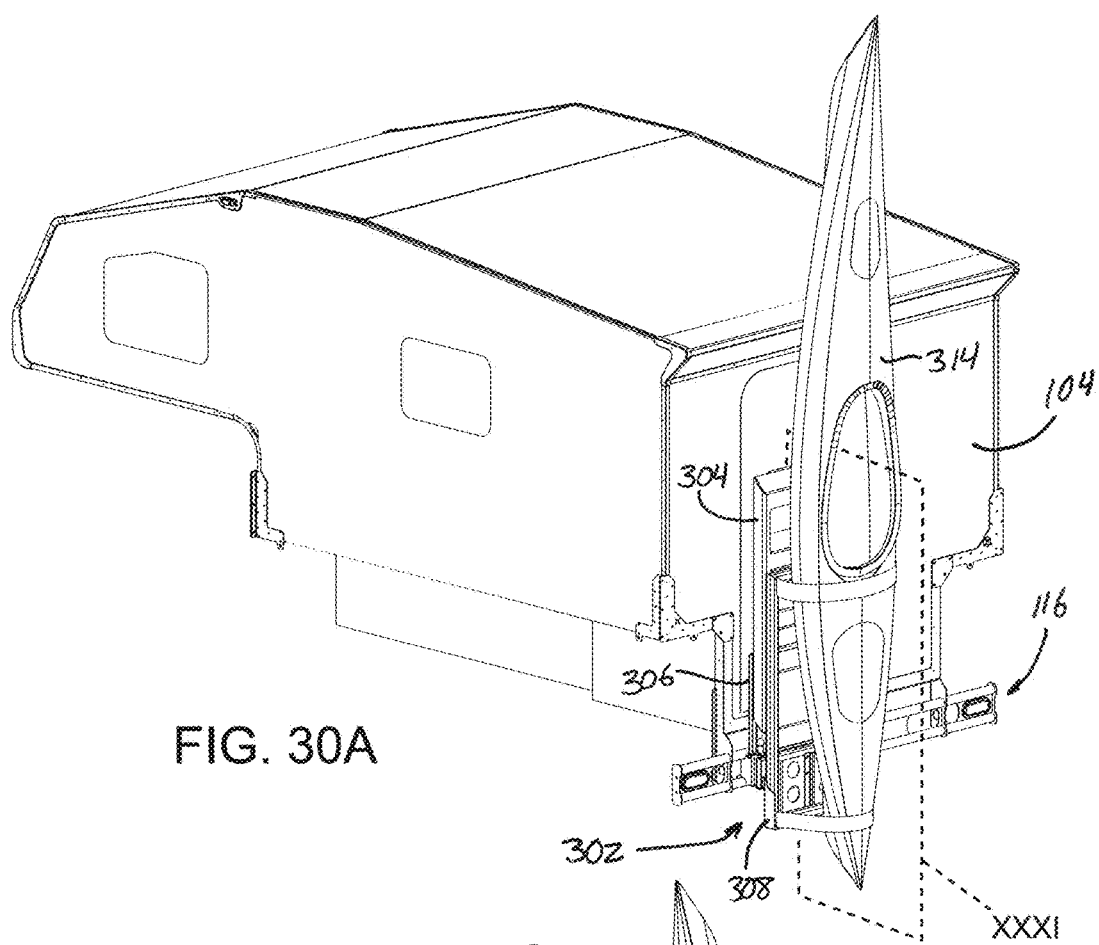
FIGS. 30A and 30B are left-rear perspective views of the vehicle mounted accessory support platform, shown mounted to a rear of a truck-bed mounted camper unit and fitted with a repositionable staircase and sports equipment rack shown in the stowed and deployed configurations, respectively.
Figure 30B:
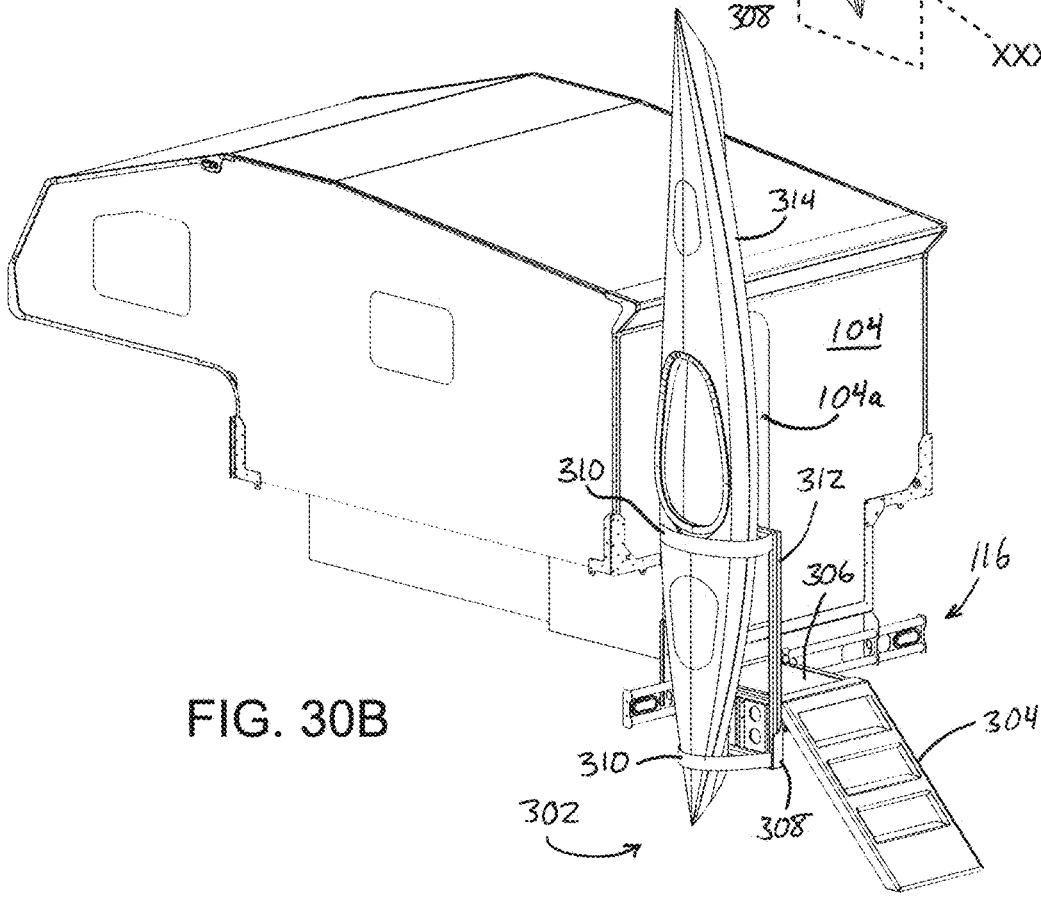
Figure 31:
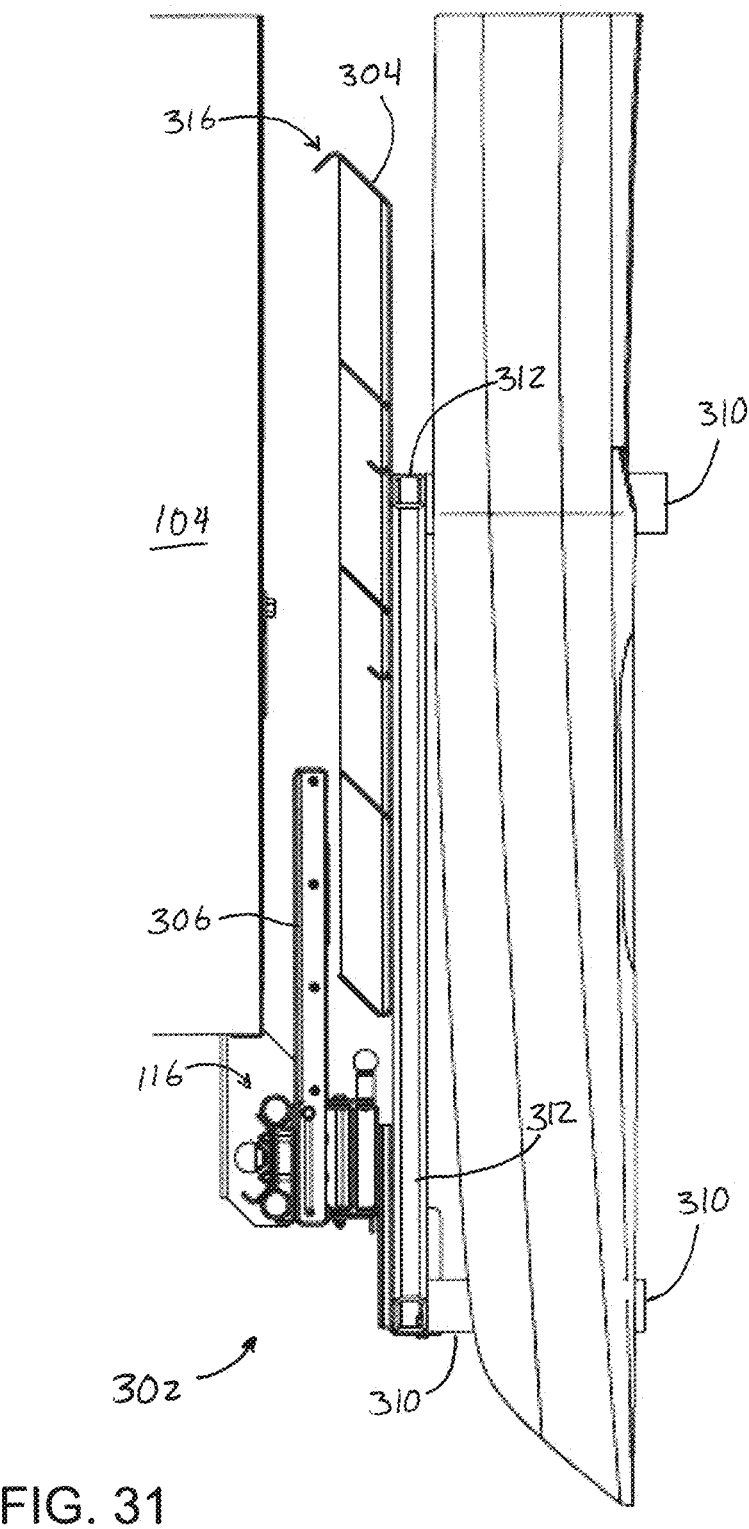
FIG. 31 is a side sectional view taken along plane XXXI of FIG. 30A.
Figure 32:
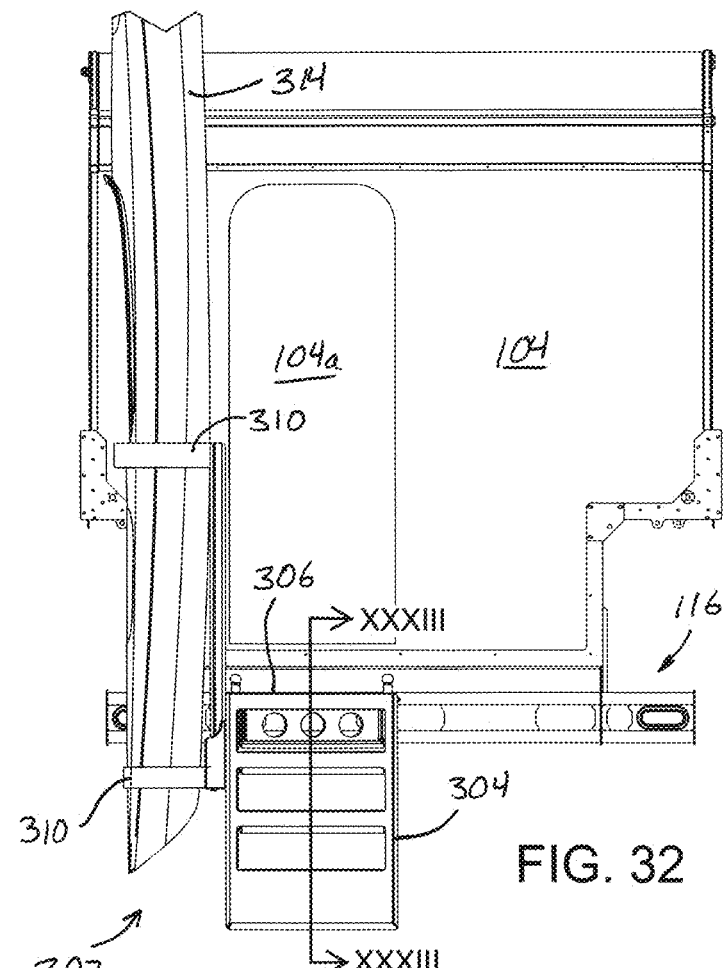
FIG. 32 is a rear elevation view of the accessory support platform, truck-bed mounted camper unit, repositionable staircase and sports equipment rack in the deployed configuration of FIG. 30B.
Figure 33:
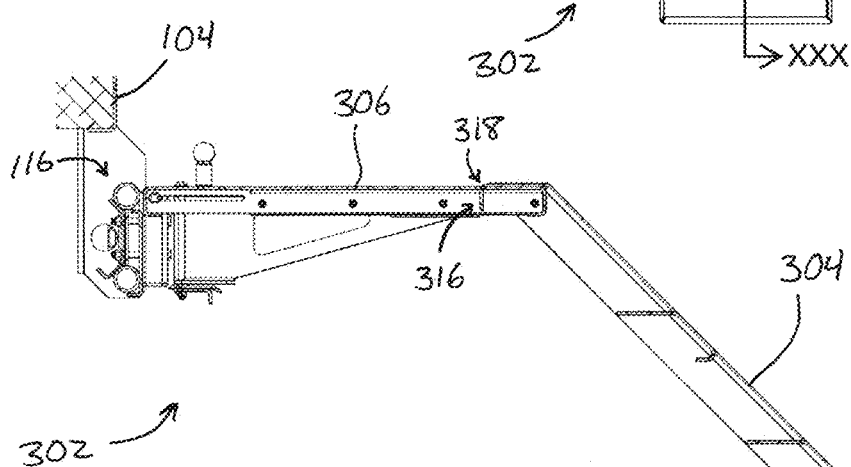
FIG. 33 is a side sectional view taken along line XXXIII-XXXIII of FIG. 32.
Figure 34A:
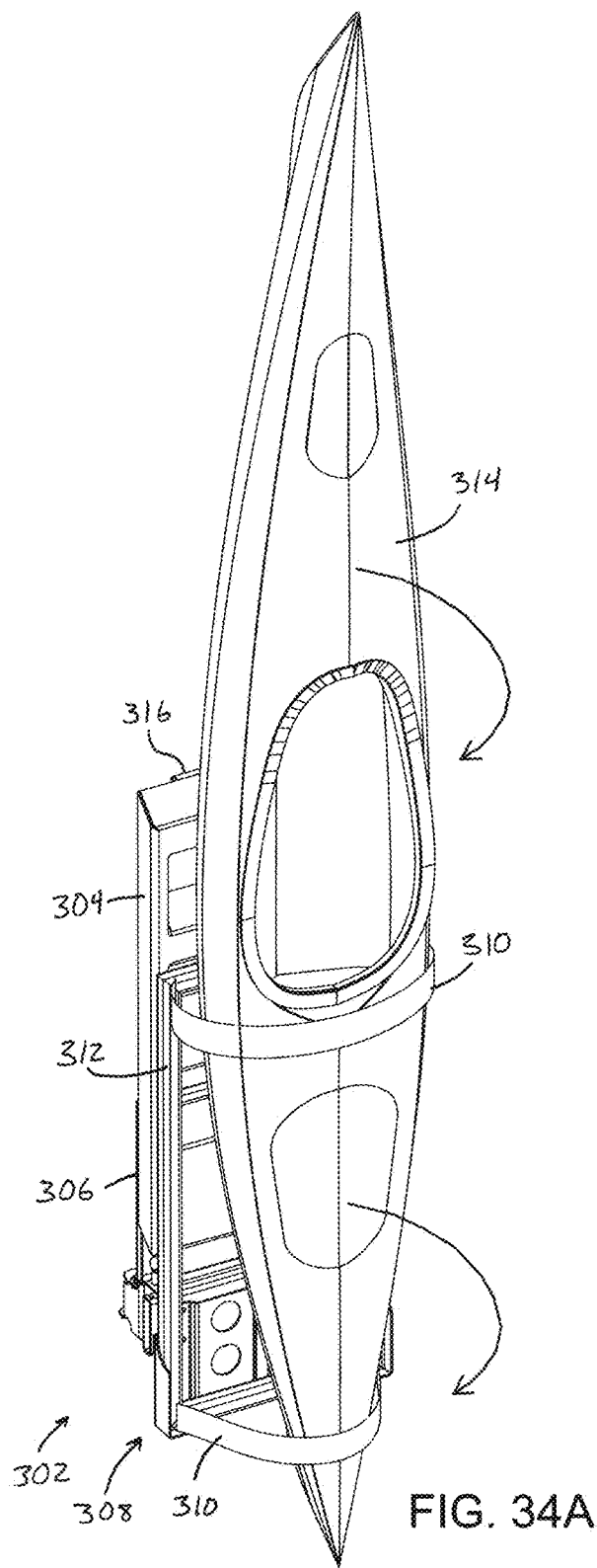
FIGS. 34A-34G are a series of left-rear perspective views of the repositionable staircase and sports equipment rack of FIGS. 30A and 30B, depicting sequential steps of converting from the stowed configuration to the deployed configuration.
Figure 34B:
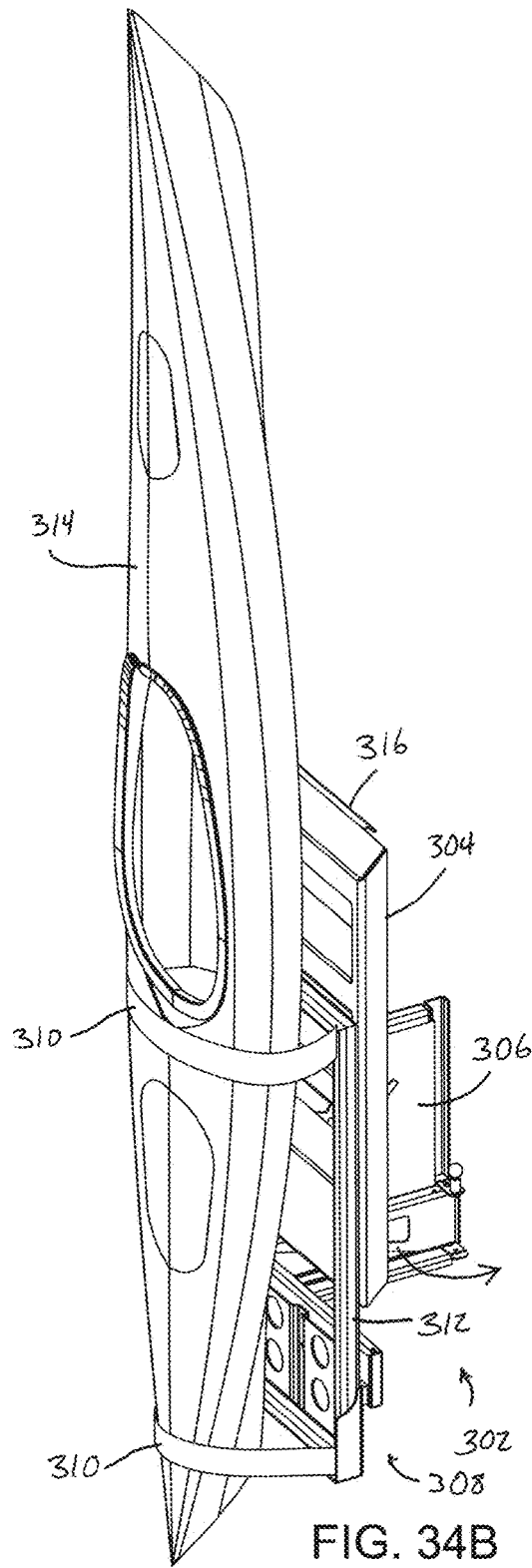
Figure 34C:
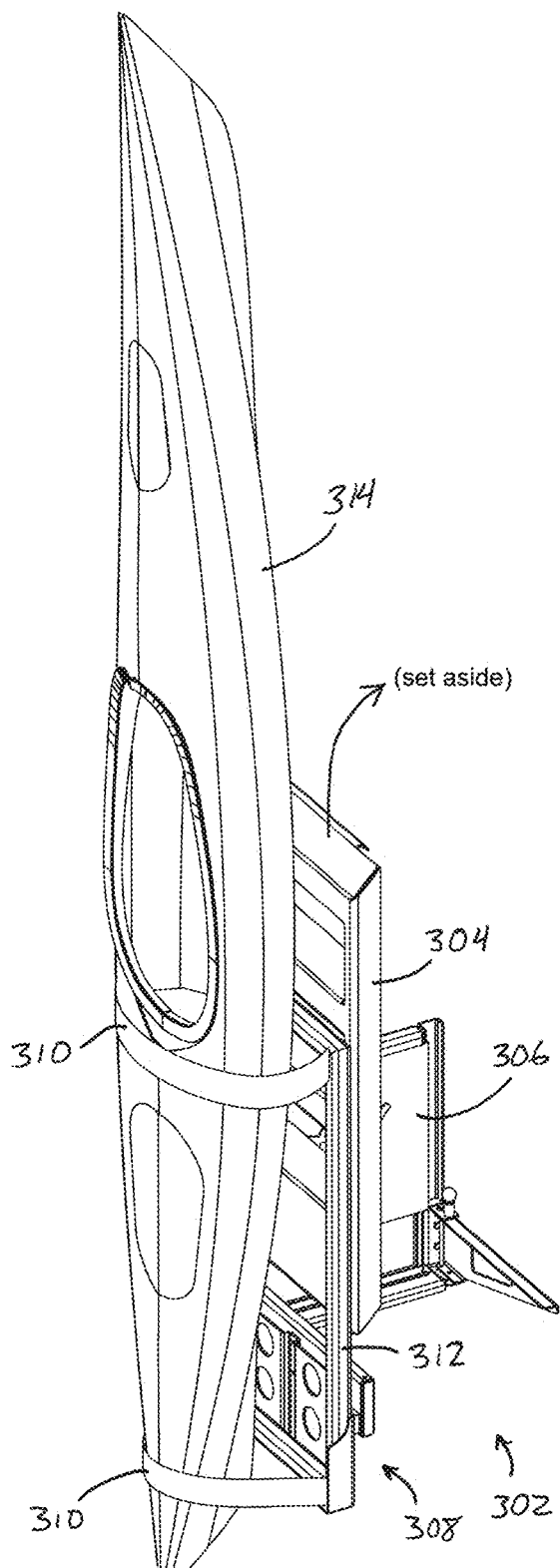
Figure 34D:
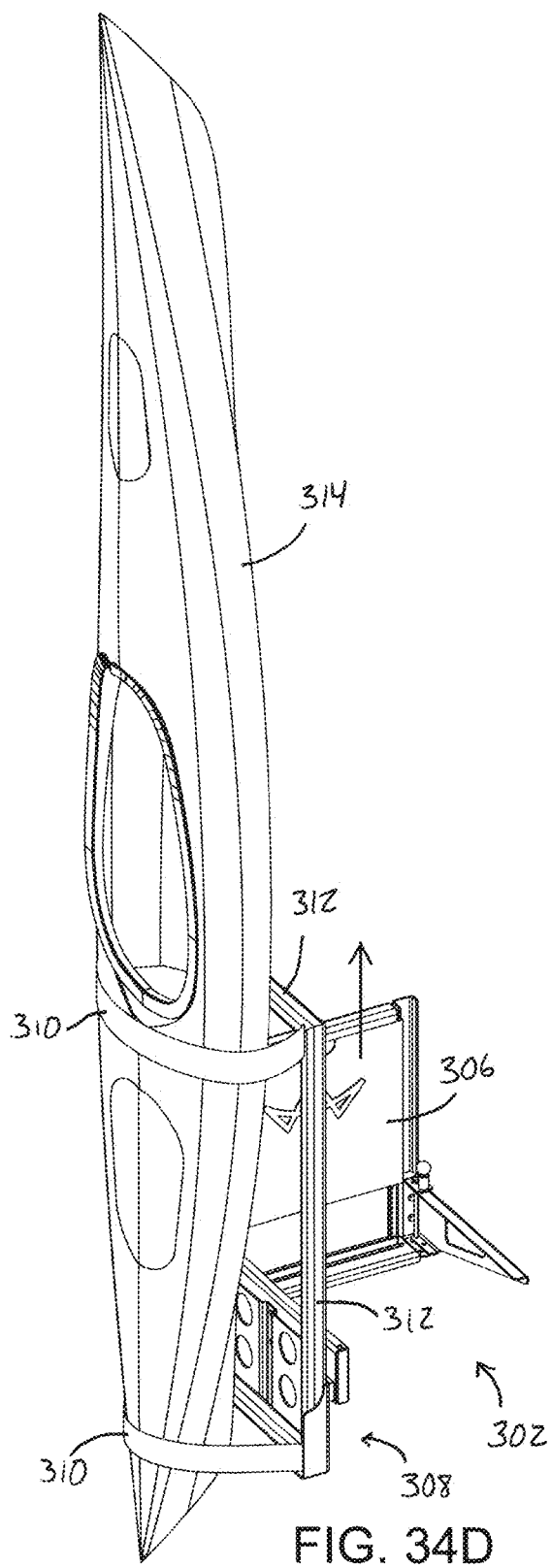
Figure 34E:
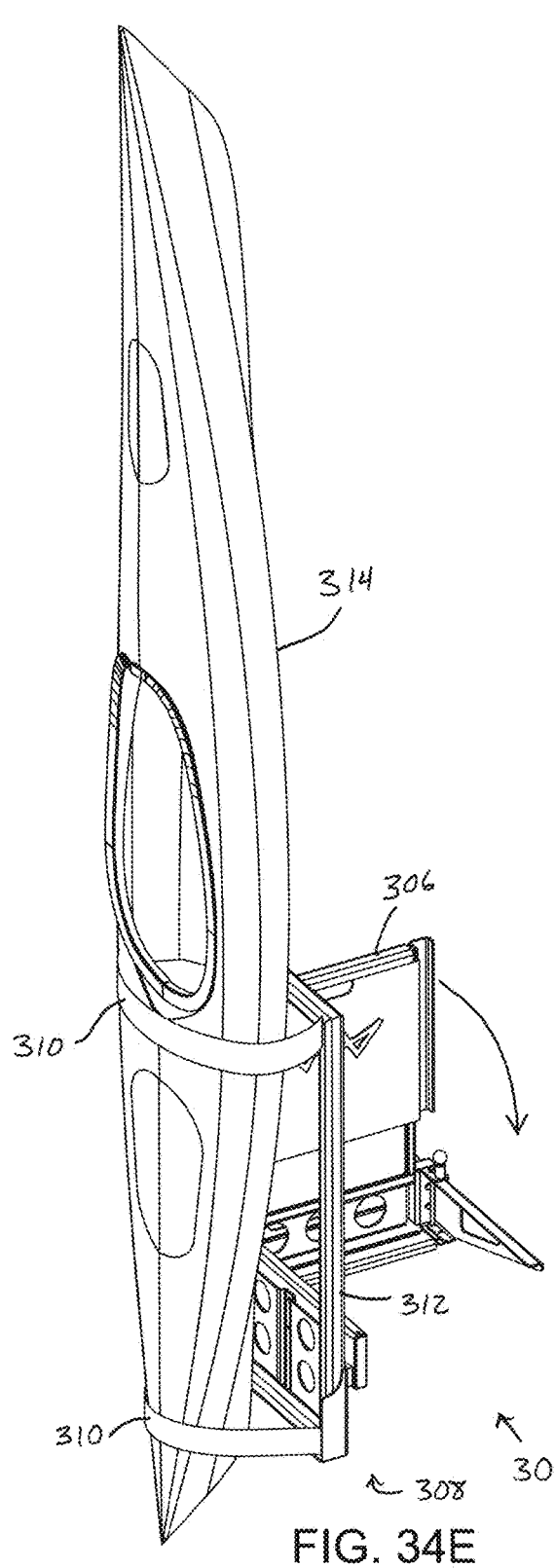
Figure 34F:
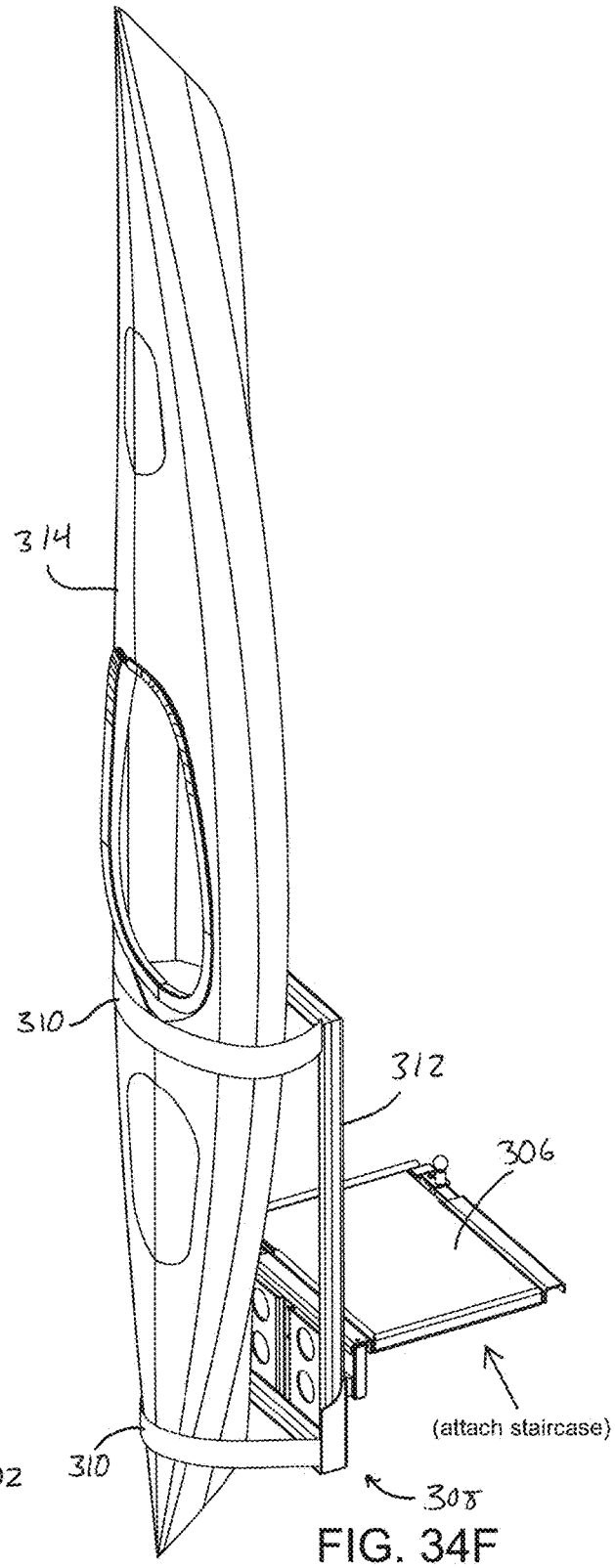
Figure 34G:
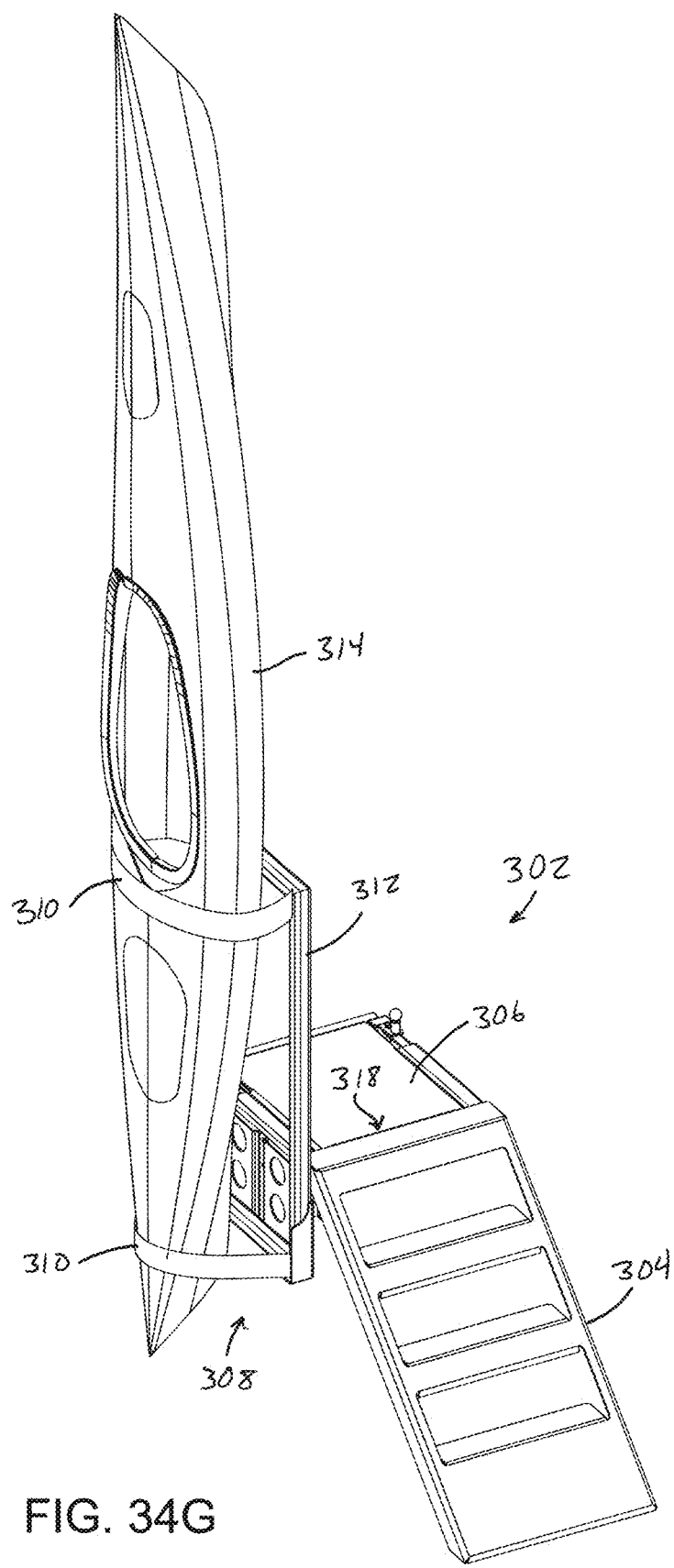

In the illustrated embodiment of FIGS. 30A-34G, staircase 304 is a rigid structure having an upper hook portion 316 that is received in an elongate slot 318 formed in platform 306 when the staircase 304 is set up for use, such as shown in FIGS. 33 and 34G. When staircase 304 is not it use, it may be hung on the frame 312 of equipment support 308 as shown in FIGS. 30A, 31, and 34A-34C. In this arrangement, staircase 304 is supported between platform 306 and frame 312 when combination unit 302 is stowed as shown in FIGS. 30A, 31, and 34A. Optionally, removable balusters may be provided along staircase 304 and platform 306, with a chain or handrail extending between the balusters' upper ends when staircase 304 and platform 306 are deployed.

To reposition combination unit 302 from the stowed configuration to the deployed configuration, equipment support 308 (along with the attached kayak 314 and staircase 304) is first swung away from platform 306 as shown in FIGS. 34A and 34B. This requires first manually lifting a knob, in a manner that will be understood with reference to the above descriptions of the use of knob 220, in order to release the equipment support 308. A pivotable platform support frame is then swung outwardly (FIGS. 34B and 34C) and the platform 306 raised and lowered (FIGS. 34D-34F). Staircase 304 is removed from equipment support frame 312 either before or after deploying platform, and then hook portion 316 of staircase 304 is set into slot 318 of platform 306 as shown in FIG. 34G to complete the deployment or setup process. Kayak 314 is accessible from the ground surface surrounding combination unit 302 by releasing straps 310, which can be done when equipment support 308 is stowed or deployed so that the kayak (or other sports equipment) is accessible regardless of whether or not platform 306 and staircase 304 are deployed. This way, access stairs and a platform may be provided for users of truck-bed mounted camper 104 or any vehicle fitted with support rail assembly or system 116, and can provide storage for recreational equipment in a manner that stows compactly when staircase 304 and standing platform 306 are not needed, and that remains accessible when staircase 304 and platform 306 are deployed.

Figure 35:
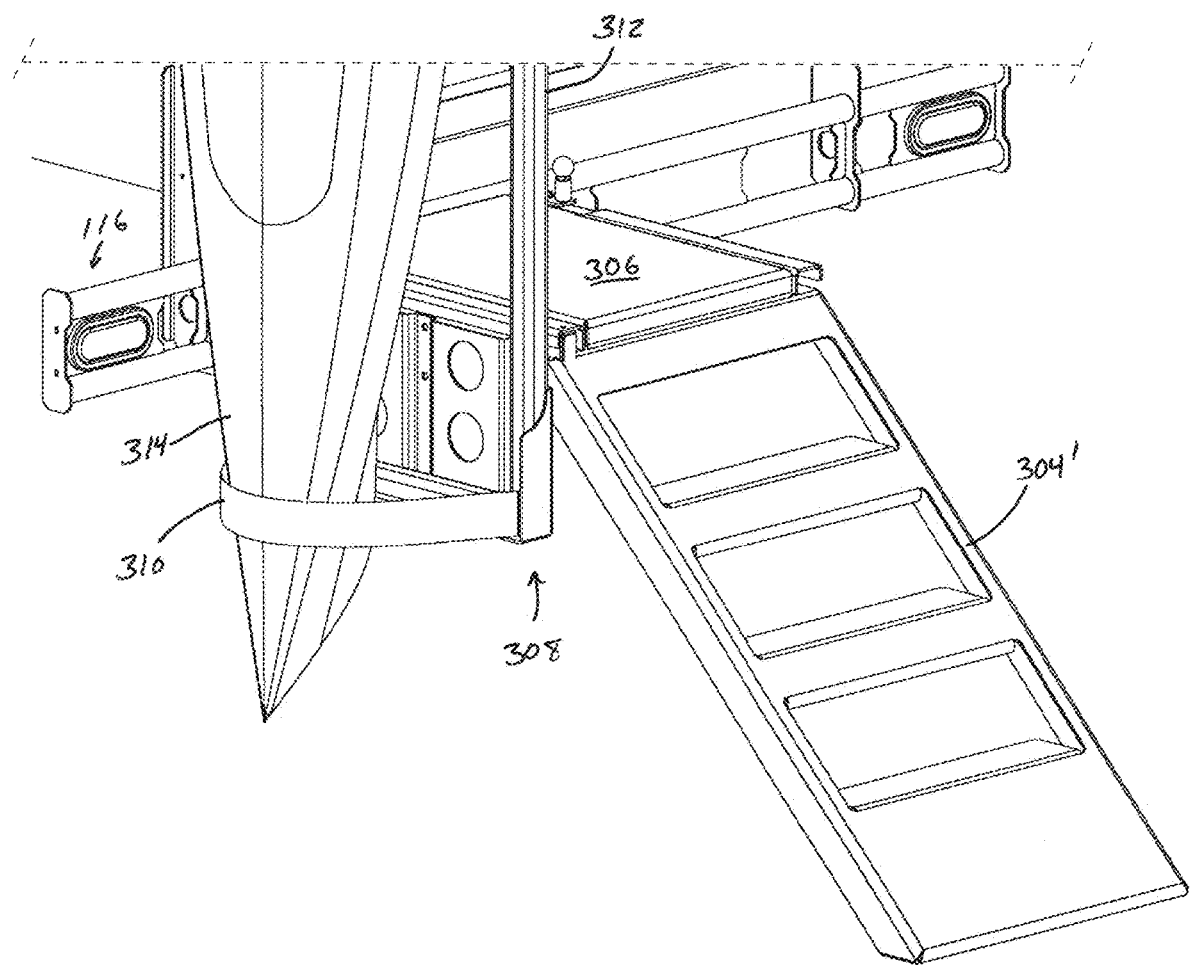
FIG. 35 is a left-rear perspective view of the sports equipment rack of FIGS. 30A and 30B, shown fitted with pivotable staircase.
Figures 36A, 36B:
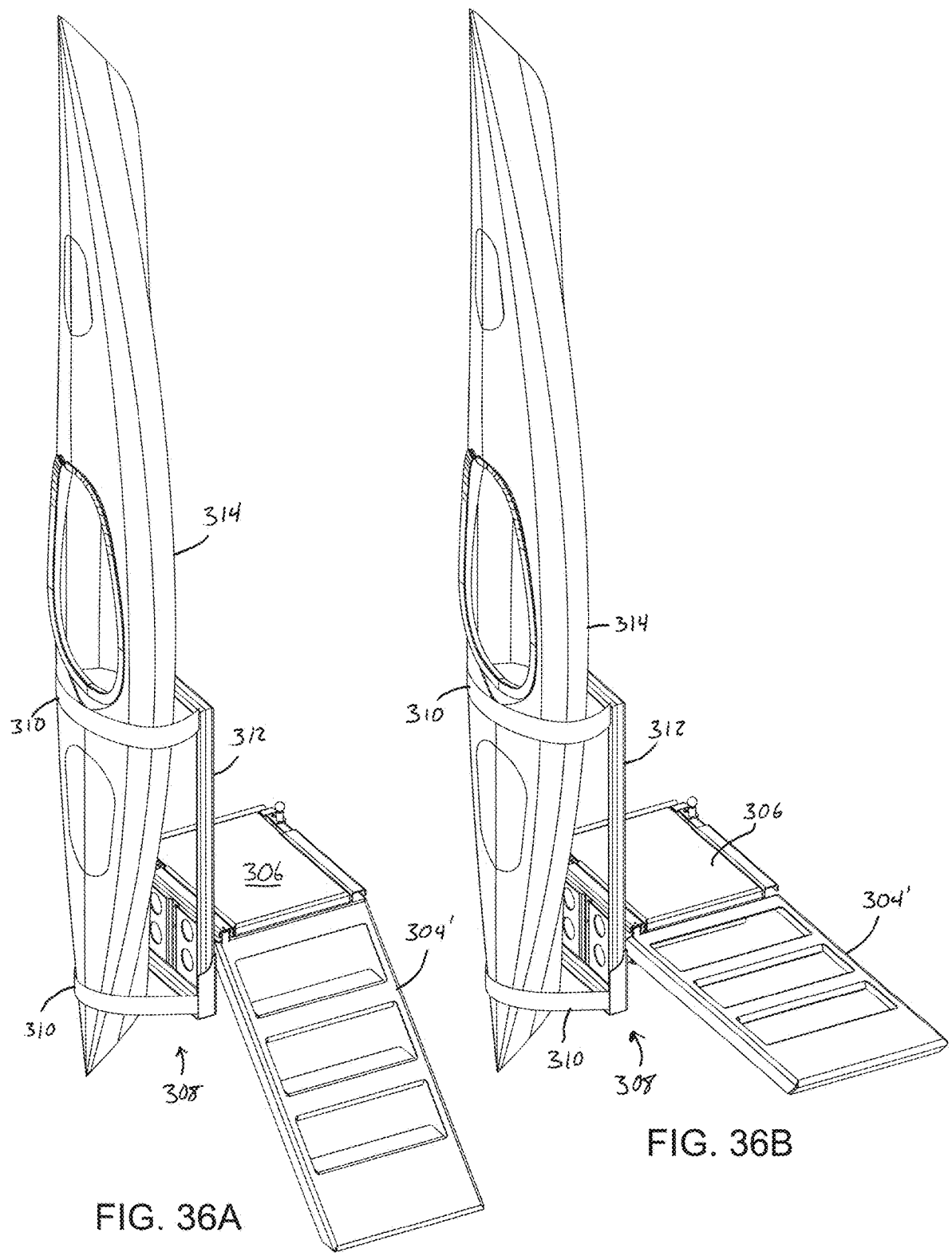

Variations of combination unit 302 are envisioned, such as a pivoting staircase 304' that is pivotably attached to support platform 306 at all times, such as shown in FIGS. 35-36F. Pivoting staircase 304' can be angled downwardly to the surrounding ground surface when platform 306 is deployed (FIGS. 35 and 36A), and can be pivoted up to be substantially coplanar with platform 306 when platform 306 and staircase 304' are to be stowed as shown in FIGS.

36B-36F. A releasable pivot-locking mechanism may be used to secure pivoting staircase 304' to platform 306, so that a user may release the pivot locks when staircase 304' is to be lowered for use, and so that the user may secure the staircase 304' parallel to platform 306 for stowage.

Thus, the illustrative embodiments of the vehicle mounted accessory support platform provide an interface for supporting removable accessories adjacent to or alongside a vehicle or portable living quarter, such as a truck-bed mounted camper. A support frame is coupled between the truck camper and a rail support system that is provided for supporting the removable accessory. The support frame supports or suspends a support rail system from the rear portion of the truck camper. The rail system includes an upper support rail and a lower support rail that is suspended below and apart from the upper rail. The removable accessory is preferably readily repositionable relative to the upper and lower support rails. A coupling bracket is attached to the removable accessory through a gap between the upper and lower rails to secure the accessory to the rail system. Alternatively, one or more hangers having one or more hooks may be provided for coupling the removable accessory to the rail system. The coupling bracket and the hangers may be utilized together to support the accessory at the rail system. The accessory support platform provides a generally universal interface for attaching various different accessories in various different positions and configurations.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An accessory support platform for a vehicle, said accessory support platform comprising:
   a support frame configured to couple to the vehicle;
   an upper support rail coupled to said support frame;
   a lower support rail spaced apart from said upper support rail and coupled to said support frame;
   a removable accessory coupled directly to both of said upper and lower support rails, wherein said removable accessory is repositionable relative to said upper and lower support rails; and
   a universal accessory mount coupled directly to said upper and lower support rails and configured to releasably secure said removable accessory directly to both of said upper and lower support rails.

2. The accessory support platform of claim 1, wherein said universal accessory mount comprises a coupling bracket fastened to a rear portion of said removable accessory, wherein said coupling bracket and said removable accessory cooperate with one another to clamp against opposite sides of each of said upper and lower support rails.

3. The accessory support platform of claim 2, further comprising a plurality of mechanical fasteners extending from said coupling bracket to said removable accessory, said mechanical fasteners extending through a gap between said upper and lower support rails, wherein said mechanical fasteners are tightenable to increase a clamping force against said opposite sides of said support rails.

4. The accessory support platform of claim 3, wherein said coupling bracket comprises:
   an elongate rectangular plate configured to span between said upper and lower support rails;
   an upper wing disposed along an upper edge of said elongate rectangular plate and extending upward at an oblique angle from said elongate rectangular plate; and
   a lower wing disposed along a lower edge of said elongate rectangular plate and extending downward at an oblique angle from said elongate rectangular plate;
   wherein when said coupling bracket is fastened to said removable accessory, an upward-facing surface of said upper wing engages said upper support rail and a downward-facing surface of said lower wing engages said lower support rail.

5. The accessory support platform of claim 4, wherein a rear portion of said removable accessory extends between said upper and lower support rails.

6. The accessory support platform of claim 2, wherein said coupling bracket comprises:
   an elongate rectangular plate configured to span between said upper and lower support rails;
   an upper wing disposed along an upper edge of said elongate rectangular plate and extending upward at an oblique angle from said elongate rectangular plate; and
   a lower wing disposed along a lower edge of said elongate rectangular plate and extending downward at an oblique angle from said elongate rectangular plate;
   wherein when said coupling bracket is fastened to said removable accessory, an upward-facing surface of said upper wing engages said upper support rail and a downward-facing surface of said lower wing engages said lower support rail.

7. The accessory support platform of claim 1, wherein said removable accessory comprises at least one of an access platform, a deployable stair, a storage compartment, and a slideable storage drawer.

8. The accessory support platform of claim 7, wherein said removable accessory comprises said deployable stair, said deployable stair comprising an extendable stair tread.

9. An accessory support platform for a vehicle, said accessory support platform comprising:
   an upper support rail;
   a lower support rail spaced below said upper support rail;
   a removable accessory coupled directly to both of said upper and lower support rails, wherein said removable accessory is repositionable relative to said upper and lower support rails; and
   a coupling bracket comprising an elongate plate and a plurality of mechanical fasteners extending from said coupling bracket and between said upper and lower support rails to said removable accessory;
   wherein said elongate plate is configured to directly engage both of said upper and lower support rails, and said mechanical fasteners are configured to releasably secure said removable accessory directly to both of said upper and lower support rails by clamping said upper and lower support rails between said elongate plate and said removable accessory.

10. The accessory support platform of claim 9, wherein said elongate plate comprises a rectangular central plate section;
   an upper wing disposed along an upper edge of said rectangular central plate section and extending upward at an oblique angle from said rectangular central plate section; and
   a lower wing disposed along a lower edge of said rectangular central plate section and extending downward at an oblique angle from said rectangular central plate section;

wherein when said coupling bracket is fastened to said removable accessory, an upward-facing surface of said upper wing engages a downward-facing surface of said upper support rail and a downward-facing surface of said lower wing engages an upward-facing surface of said lower support rail to wedge said coupling bracket between said upper and lower support rails.

11. The accessory support platform of claim 10, wherein said mechanical fasteners are spaced between said upper and lower support rails, and threadably engage a rear portion of said removable accessory.

12. The accessory support platform of claim 11, wherein said rear portion of said removable accessory extends into a gap defined between said upper and lower support rails.

13. The accessory support platform of claim 12, wherein said rectangular central plate section extends into the gap defined between said upper and lower support rails.

14. The accessory support platform of claim 9, wherein a rear portion of said removable accessory extends into a gap defined between said upper and lower support rails.

15. The accessory support platform of claim 14, wherein at least a portion of said elongate plate extends into the gap defined between said upper and lower support rails.

16. The accessory support platform of claim 15, wherein said rear portion of said removable accessory comprises a tab portion configured to directly contact said upper and lower support rails.

17. The accessory support platform of claim 9, wherein said removable accessory comprises at least one of an access platform, a deployable stair, a storage compartment, and a slideable storage drawer.

18. The accessory support platform of claim 17, wherein said removable accessory comprises said deployable stair, said deployable stair comprising an extendable stair tread.

* * * * *